US008874841B2

(12) United States Patent
Patterson et al.

(10) Patent No.: US 8,874,841 B2
(45) Date of Patent: Oct. 28, 2014

(54) METHOD AND SYSTEM FOR DISTRIBUTING SNAPSHOTS ACROSS ARRAYS OF AN ARRAY CLUSTER

(75) Inventors: Brian L. Patterson, Boise, ID (US); Michael B. Jacobson, Boise, ID (US); Ronald D. Rodriguez, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2062 days.

(21) Appl. No.: 11/799,307

(22) Filed: Apr. 30, 2007

(65) Prior Publication Data
US 2008/0270694 A1    Oct. 30, 2008

(51) Int. Cl.
*G06F 12/00* (2006.01)
*G06F 3/06* (2006.01)
*G06F 11/14* (2006.01)
*G06F 11/20* (2006.01)

(52) U.S. Cl.
CPC ............ *G06F 3/0665* (2013.01); *G06F 11/201* (2013.01); *G06F 11/2092* (2013.01); *G06F 11/1451* (2013.01); *G06F 11/1464* (2013.01); *G06F 3/067* (2013.01); *G06F 3/0617* (2013.01); *G06F 3/064* (2013.01)
USPC .......................................... 711/114

(58) Field of Classification Search
USPC .................................. 711/161, 162
See application file for complete search history.

(56) References Cited

U.S. PATENT DOCUMENTS

| 6,085,298 A * | 7/2000 | Ohran ........................... 711/162 |
| 6,983,349 B2 * | 1/2006 | Okumoto et al. ............. 711/147 |
| 2006/0047926 A1 * | 3/2006 | Zheng ............................ 711/162 |
| 2007/0079105 A1 * | 4/2007 | Thompson .................... 711/201 |

* cited by examiner

*Primary Examiner* — Reginald Bragdon
*Assistant Examiner* — Hamdy S Ahmed

(57) ABSTRACT

Embodiments of the present invention include array-cluster systems, and methods employed in array-cluster systems, that allow snapshot data to be distributed over multiple arrays within an array cluster. By distributing snapshot data over multiple arrays within an array cluster, the load, generally related to the number of access operations directed to the arrays within an array cluster, may be more evenly distributed among the arrays of an array cluster, preventing increased latencies associated with overloading individual arrays Distributed snapshots may also facilitate high availability and fault tolerance within an array cluster.

20 Claims, 33 Drawing Sheets

METHOD AND SYSTEM FOR DISTRIBUTING SNAPSHOTS ACROSS ARRAYS OF AN ARRAY CLUSTER

TECHNICAL FIELD

The present invention is related to disk arrays and distributed data storage systems and, in particular, to an array cluster that virtualizes, to host computers, array-controller associations with snapshot logical units.

BACKGROUND OF THE INVENTION

The data capacities and data-access speeds of mass-storage devices have increased phenomenally during the past 50 years, at rates even greater than the often-discussed rate of increase in processor speeds and functionalities. Large, rigid, removable disk platters used in many computers during the 1970's stored less than a megabyte of data, while relatively low-cost personal computers can now be purchased with small, terabyte drives. In early computer systems, mass-storage devices were generally directly interconnected with the computer processor, electronic memory, and other computer components. More recently, large, highly-available and fault-tolerant disk arrays have been developed both as peripheral mass-storage devices directly linked to individual computer systems as well as for use as more autonomous, remote mass-storage devices accessible to many different computer systems through communications networks. Array clusters, an even more recent development, provide multiple disk-array controllers that access commonly-controlled mass-storage devices through a communications medium.

In general, disk arrays and disk-array clusters provide a logical-unit-based interface to host computers. The data-storage space provided by the mass-storage-devices within a disk array, or accessible to the disk-array controllers of an array cluster, is partitioned into multiple logical units by the disk-array controller or array controllers associated with an array cluster. Logical units provide a useful level of indirection between host-computer-specified data-block addresses and logical-block-based disk addresses by which disk-array controllers and array-cluster-associated arrays access the mass-storage devices under their control. The snapshot operation is one example of the operations provided to host computers by disk arrays. Although snapshots may be undertaken on various different data granularities, snapshot operations will be discussed with reference to logical units in this and following sections. A snapshot operation allows a host computer to direct an array controller to make a nearly instantaneous copy of a particular logical unit. Following the snapshot operation, the original logical unit and the snapshot-logical-unit copy can be independently accessed. Although snapshot operations are currently supported, in array clusters, in the same fashion as snapshot operations are supported in individual disk arrays, designers and developers of disk-array clusters, as well as disk-array-cluster vendors and manufacturers, have recognized that additional development of snapshot operations carried out by disk-array clusters may be warranted.

SUMMARY OF THE INVENTION

Embodiments of the present invention include array-cluster systems, and methods employed in array-cluster systems, that allow snapshot data to be distributed over multiple arrays within an array cluster. By distributing snapshot data over multiple arrays within an array cluster, the load, generally related to the number of access operations directed to the arrays within an array cluster, may be more evenly distributed among the arrays of an array cluster, preventing increased latencies associated with overloading individual arrays. Distributed snapshots may also facilitate high availability and fault tolerance within an array cluster.

DETAILED DESCRIPTION OF THE INVENTION

The present invention is related to distributing original logical units and snapshot logical units generated from original logical units by snapshot operations among multiple array controllers of array clusters. Traditional arrays and snapshot operations are discussed, in a first subsection. In a second subsection, array-cluster-based embodiments of the present invention are discussed. Finally, in a third subsection, control-flow diagrams representing one embodiment of the present invention are discussed.

Traditional Arrays, Virtual Arrays, and Snapshot Operations

Figure 1:
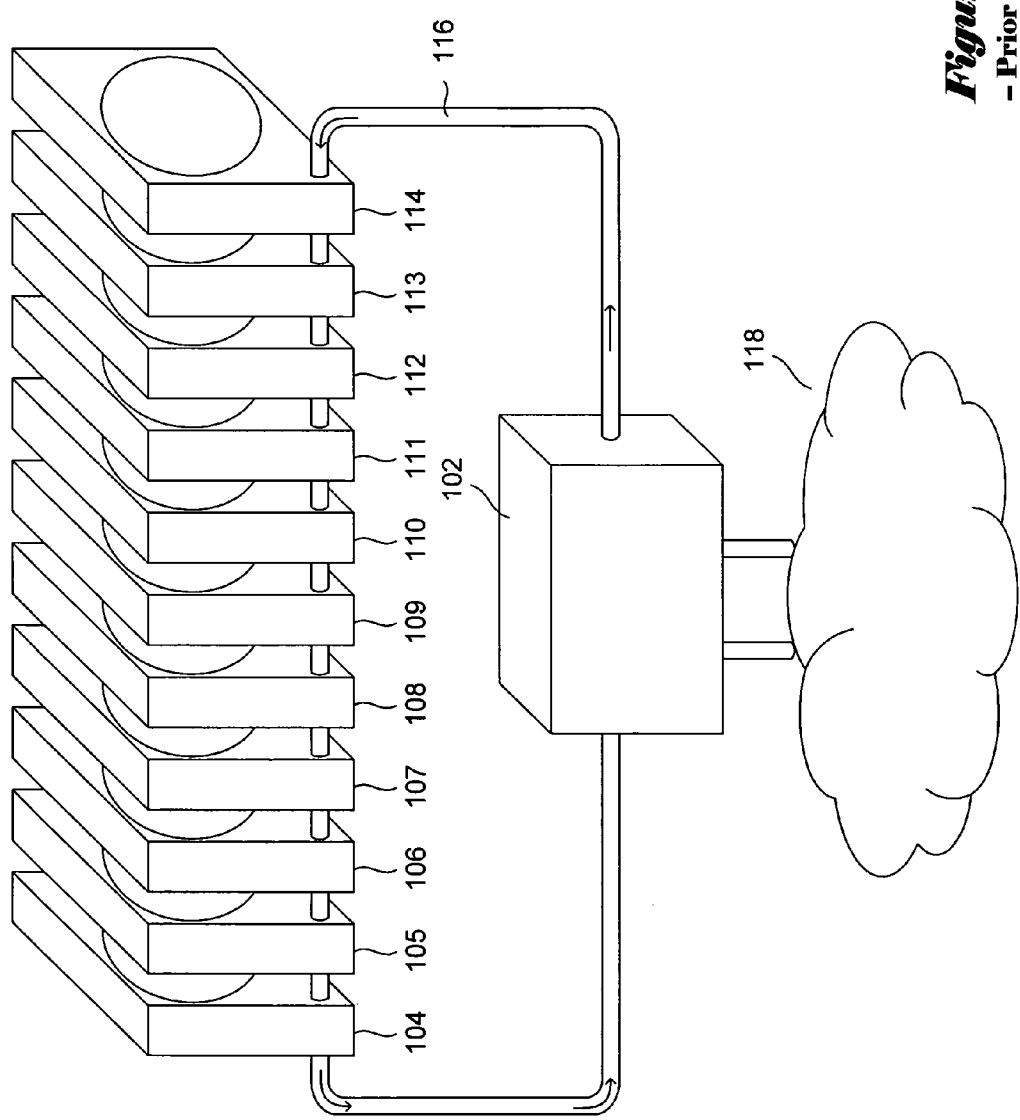
FIG. 1 shows, at very high level, a traditional disk array.

FIG. 1 shows, at very high level, a traditional disk array. The disk array includes a disk-array controller 102 and multiple mass-storage devices, commonly multi-platter disk drives 104-114, generally linked together by one or more high-bandwidth communications media 116 internal to the disk array. The data stored within the disk array is accessed, by host computers, through an external communications medium 118. FIG. 1 is not intended to illustrate the actual appearance of a disk array, or describe the many additional components within a disk array, including redundant power supplies, various peripheral devices, consoles, and other such components. Instead, for the purposes of describing the present invention, it is sufficient to understand that the basic disk-array architecture comprises a disk-array controller interconnected with multiple mass-storage devices.

In general, the disk-array controller includes one or more processors and controller firmware and software that together implement a logical-unit-based interface through which remote host computers access data stored on the mass-storage devices. The disk-array controller 102 translates logical unit numbers ("LUNs") and block addresses associated with LUNs to logical block addresses within individual mass-storage devices. In addition, the disk-array controller includes sophisticated logic for automatic, redundant storage of data, for remapping stored data in the event of hardware problems or faults, and for many other functionalities directed to providing highly-available, fault-tolerant, and flexible data storage on behalf of remote host computers.

In the following discussion, disk arrays are referred to as "arrays," and disk-array clusters are referred to as "array clusters." While arrays commonly include many high-capacity and high-speed disk devices, arrays may employ additional types of mass-storage devices and/or combinations of different types of mass-storage devices. The present invention is not concerned with details of data storage at the mass-storage-device level, and is applicable to arrays employing any number of different types of mass-storage devices.

Figure 2:
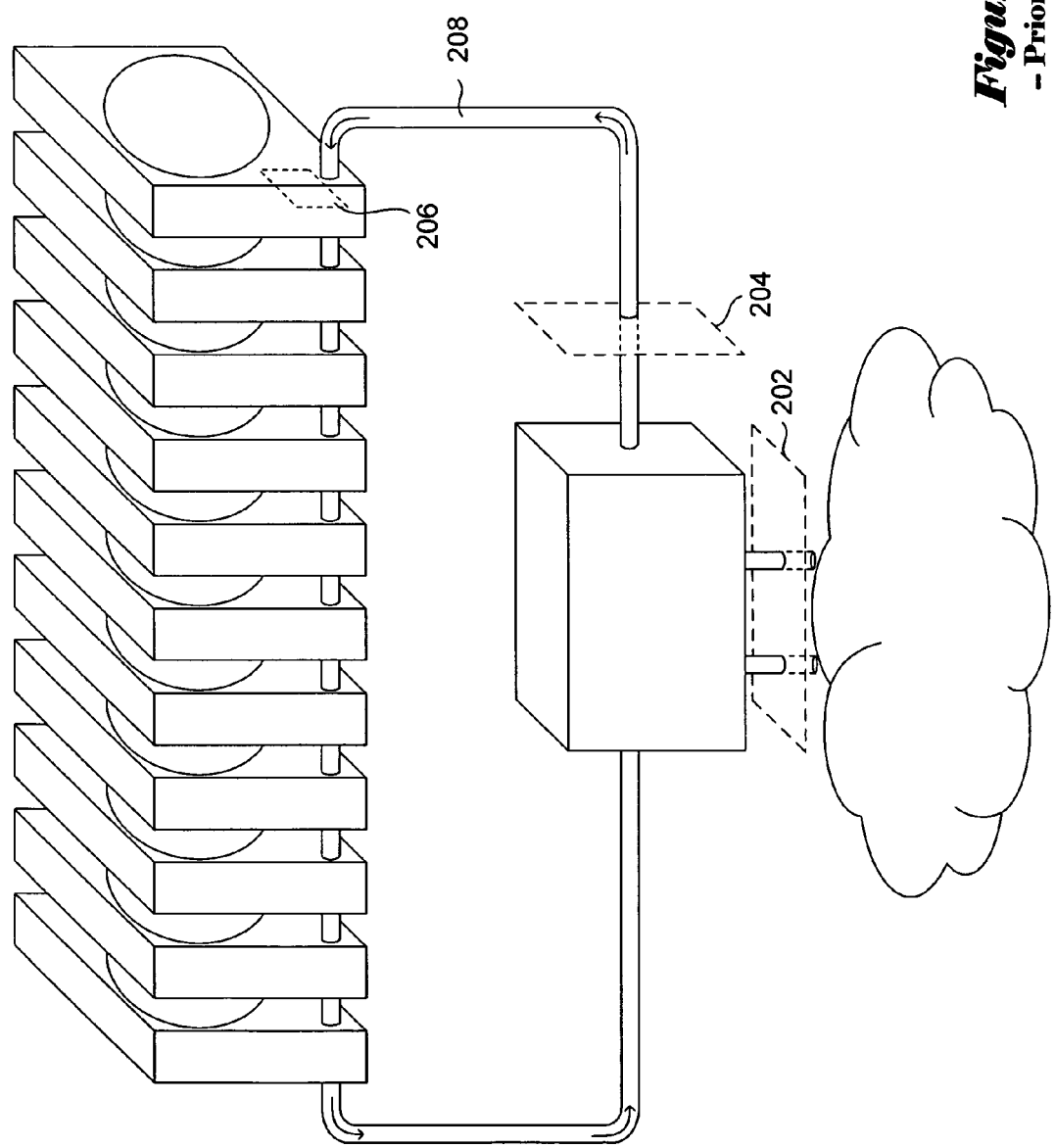
FIG. 2 illustrates three different mappings within a traditional array.

FIG. 2 illustrates three different mappings within a traditional array. A first mapping 202 associates a particular array, or array controller, with one or more network addresses. A second mapping 204 maps LUNs and block addresses associated with LUNs to particular mass-storage devices and associated logical-block addresses. A third mapping 206, within each mass-storage device, associates logical-block addresses with physical-block addresses. There may be, in many arrays and mass-storage devices, many additional levels of mappings.

Figure 3:
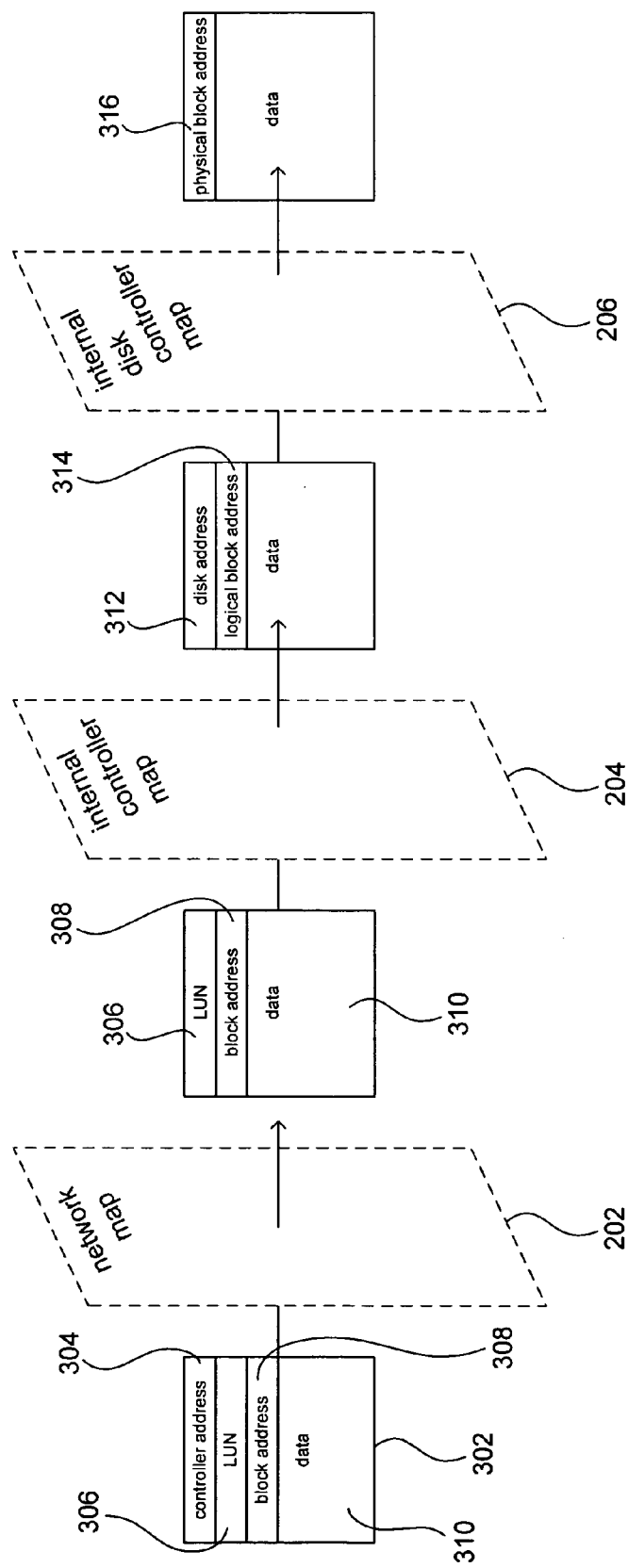
FIG. 3 illustrates address translations carried out at each of the mappings shown in FIG. 2.

FIG. 3 illustrates address translations carried out at each of the mappings shown in FIG. 2. A host computer may direct data for a WRITE operation to an array via a communications message 302 that includes the network address of the array controller 304, a LUN 306, a data-block address 308, and the data to be written 310. The communications message 302 may comprise one or more packets exchanged over the communications medium according to one or more communications protocols. The first level of mapping 202, discussed above with reference to FIG. 2, essentially directs the WRITE operation to a particular array based on the array-controller network address 304. The array controller translates the LUN and data-block address to a mass-storage-device address 312 and a logical-block address 314 associated with the mass-storage device, as represented in FIG. 2 by the second mapping 204. The mass-storage-device address 312 is generally a communications-medium address for the internal communications medium (208 in FIG. 2) within the array. When the WRITE operation is received by the mass-storage device, the mass-storage device translates the logical-block address 314, via a third mapping 206, to a physical-block address 316 by which the mass-storage-device controller locates the block within the mass-storage device in order to carry out the WRITE operation. In FIG. 3, and in the discussion below, data-access operations, including WRITE and READ, are assumed, for convenience, to be directed to individual data blocks stored within the array. However, data may be generally accessed at larger granularities, and, in certain systems, at smaller granularities.

Figure 4:
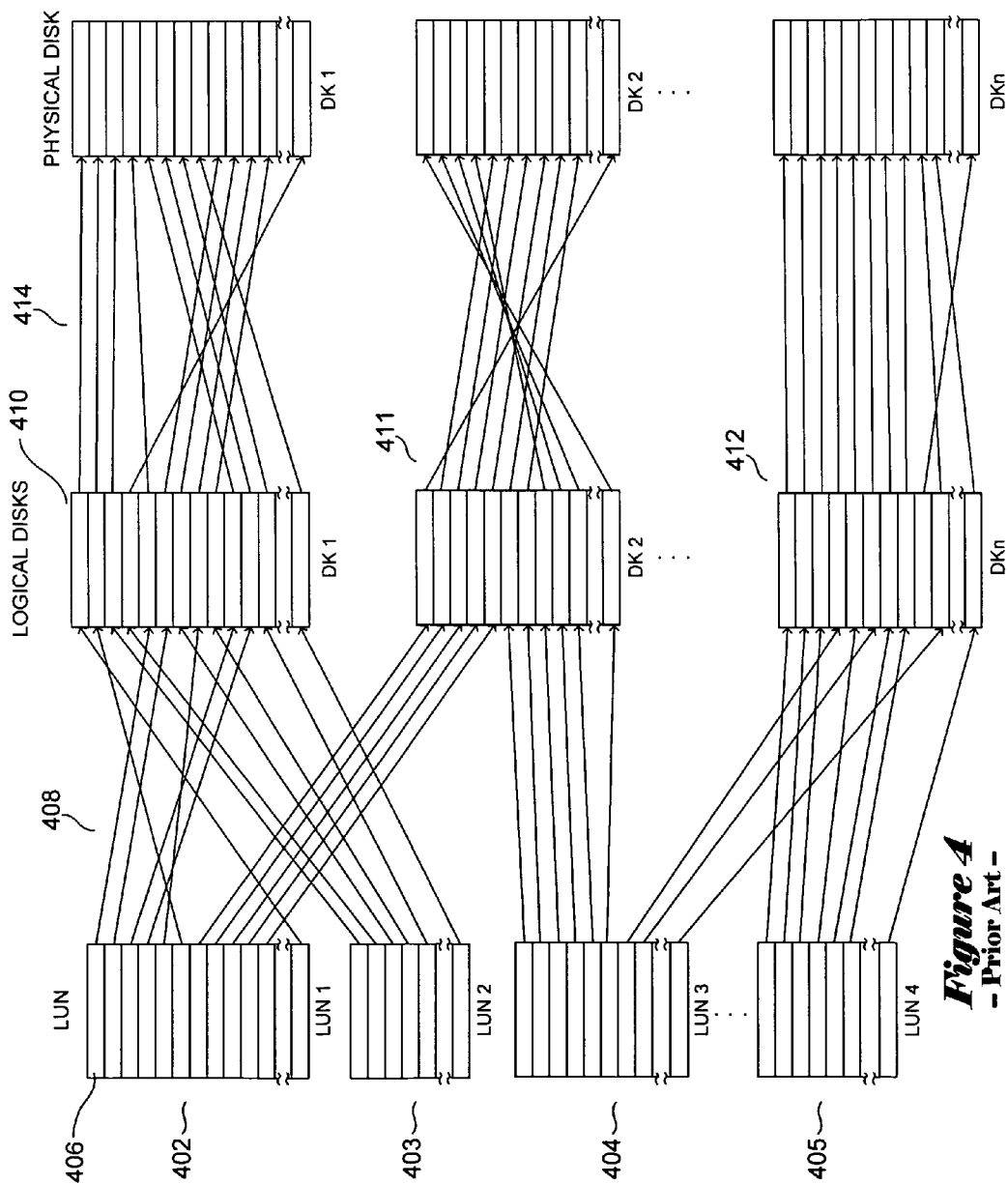
FIG. 4 illustrates the above-described mappings at a somewhat higher, abstract level.

FIG. 4 illustrates the above-described mappings at a somewhat higher, abstract level. In general, host computers view the data stored within an array as a set of one or more logical units 402-405, each logical unit comprising a sequential, ordered set of blocks, such as block 406 in logical unit 402. Each block, in turn, generally comprises a number of bytes or words of fixed size. In certain systems, blocks may be variably sized, while, in other systems, the blocks have fixed lengths. Common block lengths include 512, 1024, and 4096 bytes. Higher-level constructs, such as user-level files and directories, are mapped onto logical units by file systems within operating systems that run on host computers. The mapping shown by a first column of arrows 408 in FIG. 4 is maintained by an array controller to map LUNs and blocks to a logical view of the contents of individual mass-storage devices 410-412 within an array. In traditional arrays, this mapping is purely arithmetic, with mass-storage device physical block addresses being arithmetically computed from host-specified data block addresses without use of arbitrary redirection through a mapping table. In a virtual array, to which the current discussion is directed, a host-specified logical-block address is translated to a physical block address, as indicate by the mapping shown in FIG. 4. A mapping represented in FIG. 4 by a second column of arrows 414 allows mass-storage-device controllers to map logical block addresses to physical block addresses. This second mapping allows mass-storage-device controllers to present a single, contiguous block-address space to the array controller and other accessing entities, even though the mass-storage device may itself comprise multiple, discrete platters, each with two sides, and each accessed by one of multiple READ/WRITE heads, with platters containing remapping vectors that allow bad blocks to be remapped to spare blocks. All of these block-location considerations are hidden from accessing entities by the logical-block-address-to-physical-block-address translation mechanism 414, just as the details of the types and numbers of mass-storage devices within an array are generally hidden from accessing host computers by the first mapping 408. The various mappings also provide levels of indirection that may be additionally useful. The first mapping, for example, allows an array to provide, to host computers, logical units with sizes greater than the data capacities of individual mass-storage devices, and allows an array controller to remap LUNs and redistribute LUNs across mass-storage devices for a variety of different purposes, including fault recovery, future fault tolerance, high availability, and load balancing.

Figure 5:
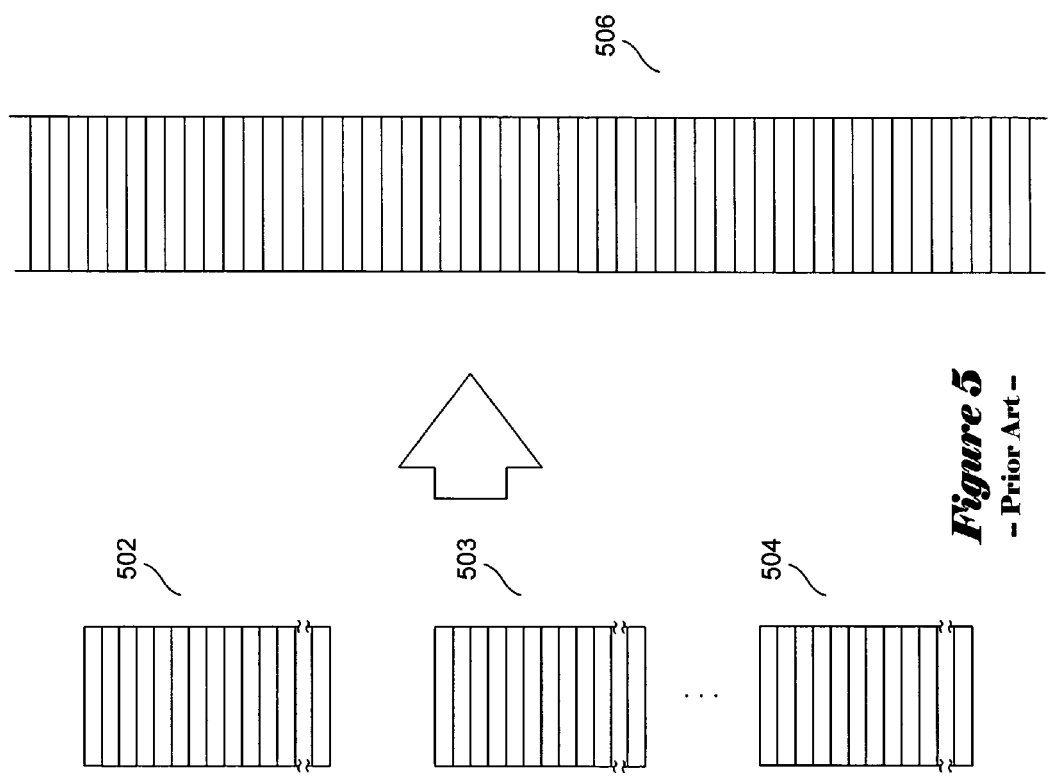
FIG. 5 illustrates the logical-block-address-space abstraction.

FIG. 5 illustrates the logical-block-address-space abstraction. In general, while individual mass-storage devices each provide a sequential, ordered logical-block-address space 501-503, it may be convenient to consider the mass-storage devices associated with an array as providing, collectively, a single, continuous, sequentially ordered logical-block-address space 506. This abstraction is useful for avoiding unnecessary complexities in illustration and discussion, since the mapping between the single, continuous, sequentially ordered logical-block-address space 506 and the discrete logical-block-address spaces of individual mass-storage devices is carried out by any of a variety of a generally well-known methods, and is therefore beyond the scope of the current discussion.

Additionally, various details concerning operation directed to the continuous, sequentially ordered logical-block-address space are omitted, in the following discussion, for the sake of clarity and brevity. As one example, an allocate-on-write operation, discussed below, involves allocating a unit of storage space in logical-block-address space, and directing a WRITE operation to the newly allocated unit of storage space, rather than to a previously allocated unit of storage. In the case that the quantity of data written by the WRITE operation exactly fills the newly allocated unit of storage space, nothing more needs to be done. However, should the WRITE command write less data to the newly allocated unit of storage, then an incomplete unit of storage would result, with remaining data either zeroed or containing uninitialized bytes. Therefore, when the granularity of WRITE commands does not match that of storage-space allocation, data must additionally be copied from the previously allocated unit of storage to the newly allocated unit of storage, generally prior to executing the WRITE operation. This merge operation may alternatively be carried out in controller memory, rather than involving two separate WRITE operations directed to the mass-storage device. In the following discussion, it is assumed that such considerations of granularity of access operations and mapping from the continuous, logical-block-address-space abstraction to actual logical-block-address spaces of mass-storage device are correctly handled, according to the underlying array-controller implementation.

In addition, array controllers generally automatically store data redundantly, as mirror copies or by using redundancy schemes related to erasure coding that involve striping data across mass-storage devices. These additional mappings and complexities need not be addressed to understand the embodiments of the present invention, discussed below. Also, array controllers may contain significant amounts of cache memories, and recently accessed blocks may be accessed by cache-based operations, rather than by operations directed to mass-storage devices. Again, these complexities need not be addressed for purposes of describing the present invention. As one example, a snapshot operation, discussed below, involves creating a virtual logical unit that initially references the logical blocks of an original logical unit. However, the original logical unit is also associated with cached data which may not have yet migrated to mass-storage devices. Thus, either the cached data associated with the original logical unit needs to be flushed to mass storage, or cached data needs to be copied, and the copy associated with the virtual logical unit. In the following discussion, it is assumed that caching, redundancy, and other array-controller-mediated storage activities, and techniques used to carry out the subsequently discussed snapshot operations related to caching, redundancy, and other array-controller-mediated storage activities, represent details below the single-logical-block-address-space abstraction.

Figure 6:
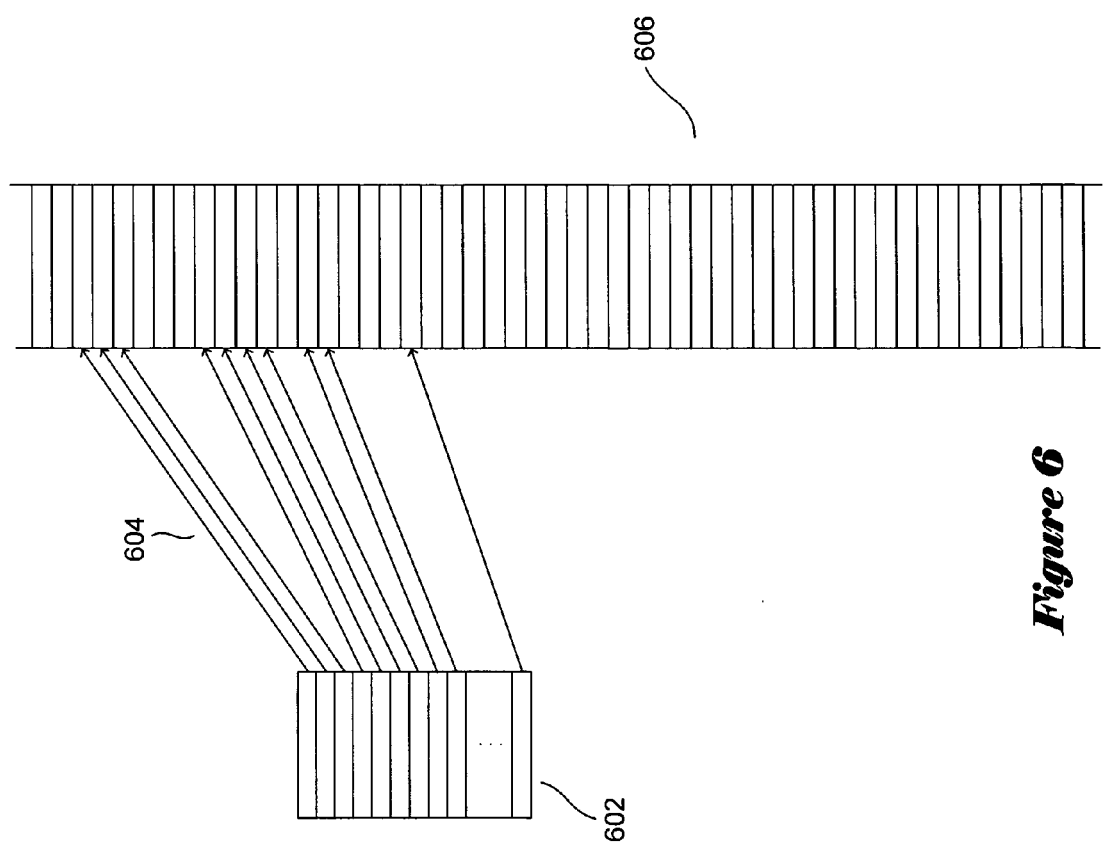
FIG. 6 illustrates the abstraction layer at which embodiments of the present invention are discussed, in following paragraphs.

FIG. 6 illustrates the abstraction layer at which embodiments of the present invention are discussed, in following paragraphs. Rather than illustrating and discussing all of the various mappings that may take place within an array, the discussion will focus on logical units, such as logical unit 602, and mappings, represented by the column of arrows 604 in FIG. 6, from the blocks of a logical unit to a logical-block-address space 606 that represents the collective data-storage capacity of the mass-storage-devices within an array. Thus, a host computer views the contents of an array as one or more logical units 602, and the array controller is responsible for mapping logical units to a logical-block-address space 606 that the array controller creates via internal mappings.

Figure 7:
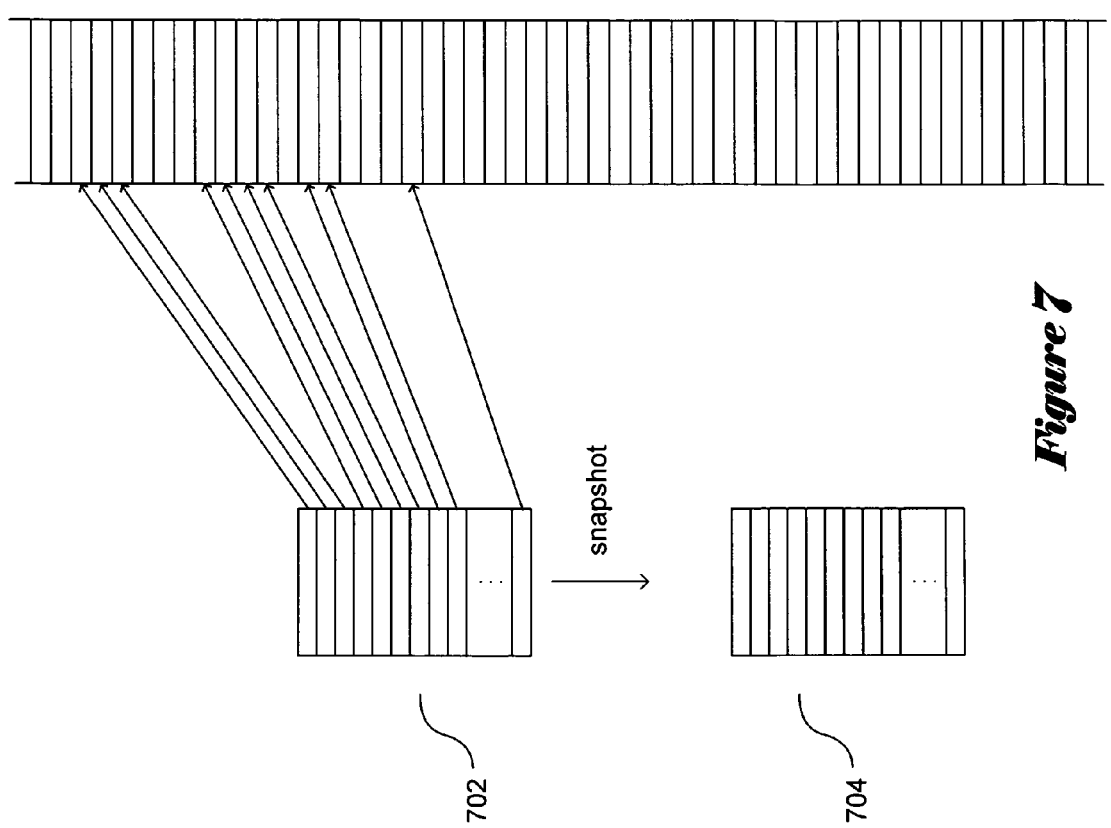
FIG. 7 illustrates a snapshot operation.

FIG. 7 illustrates a snapshot operation. As shown in FIG. 7, by issuing a snapshot command to an array controller, a host computer desires that a first logical unit 702 be replicated to produce a copy, or snapshot of the logical unit 704. Often, snapshots are convenient for backup and archiving operations. A host computer may issue a snapshot command to produce a snapshot of a particular, dynamic logical unit at a particular point in time to serve as a reference point for subsequent backup operations, should the original logical unit become subsequently corrupted or lost. The snapshot logical unit produced by a snapshot operation can then be copied to less-expensive, slower archival storage, over time, while access operations are directed to the original logical unit, providing a level of independence between normal access operations and backup operations. There are many additional uses for snapshots, as well.

Figure 8:
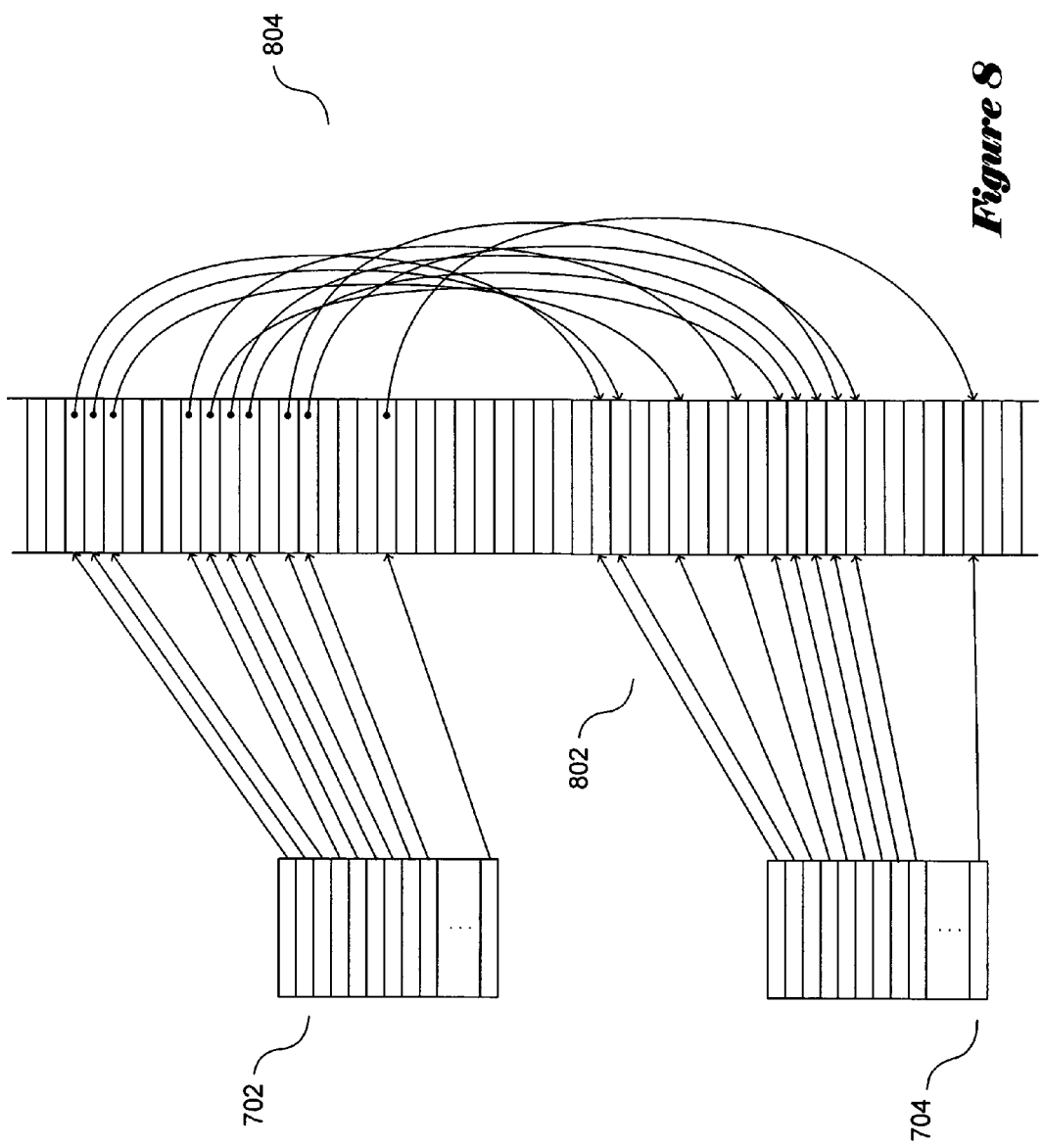
FIGS. 8-9 show two alternative methods for carrying out a snapshot operation.
Figure 9:
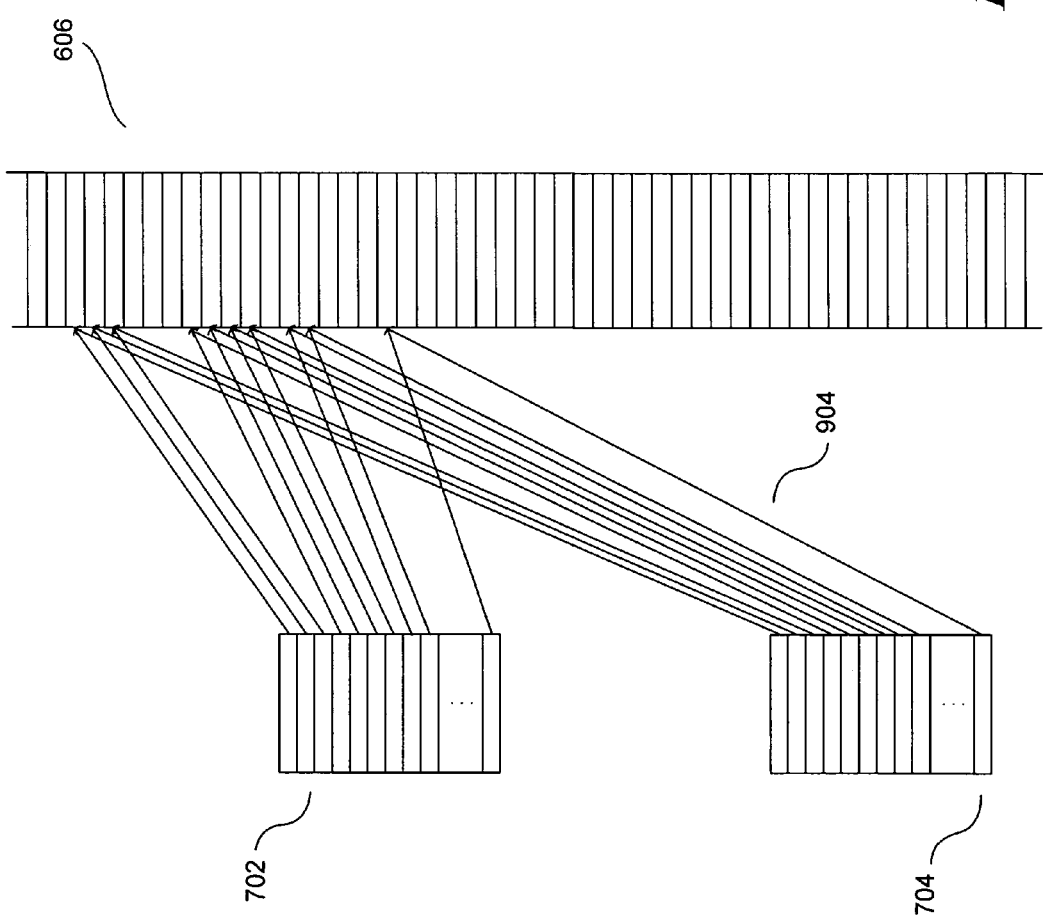

FIGS. 8-9 show two alternative methods for carrying out a snapshot operation. As shown in FIG. 8, an array controller may carry out a snapshot operation by creating a new map 802 for the snapshot 704 to newly allocated space within the logical-block-address space 606, and physically copying 804 the original data corresponding to the original logical unit 702 to the newly allocated data-storage space for the snapshot copy 704. Once the copy has completed, the snapshot operation successively completes, and the host computer can carry on accessing the original logical unit 702 as well as the snapshot copy 704. However, an immediate-copy implementation of the snapshot operation is associated with rather severe performance penalties and delays. Logical units may be enormous, and the copy operation may take large amounts of time, both for physically copying the data, as well as for allocating space for the copy and updating tables and mappings for the newly allocated space. Although it is possible to design methods by which the original logical unit 702 can remain accessible during an immediate-copy operation, such methods may be complex and introduce significant windows for errors and faults within an array. Moreover, the delay in executing a full-copy snapshot operation may be far too great for many host-computer operations and applications that rely on the snapshot operation.

For the reasons discussed above, an alternative type of snapshot operation may be implemented to defer data-block copying until needed. FIG. 9 illustrates an alternative snapshot operation with deferred data copying. As shown in FIG. 9, rather than copying data, the array controller merely copies the mapping between the original LUN 702 to the logical-block-address space 606 and associates the copied mapping 904 with the snapshot copy 704. Thus, in a brief memory-based operation, the array controller creates a snapshot logical unit 704 that essentially comprises a mapping of data blocks associated with the snapshot logical unit to the original data blocks associated with the original logical unit 702.

Figure 10:
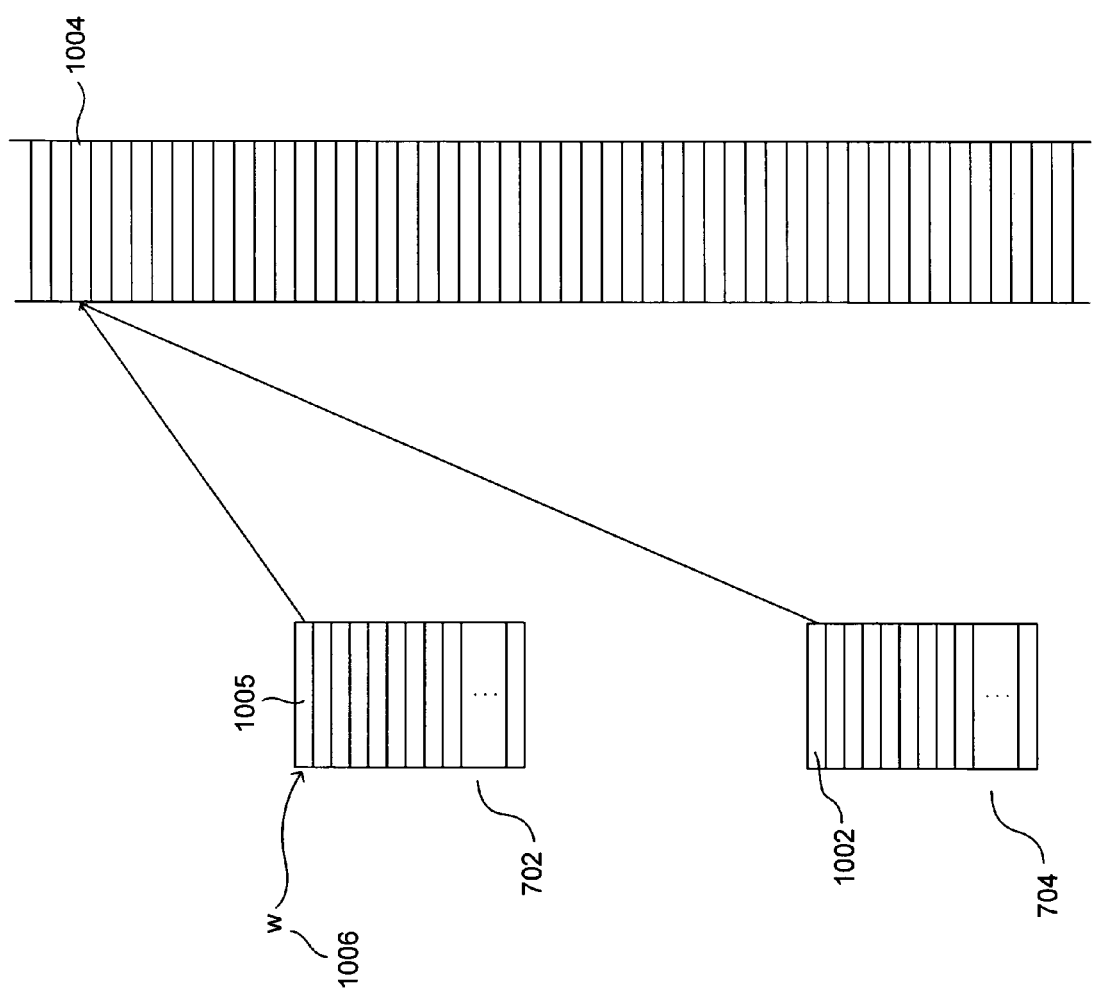
FIGS. 10-12 illustrate a WRITE operation directed to a block of an original logical unit following a snapshot operation.
Figure 11:
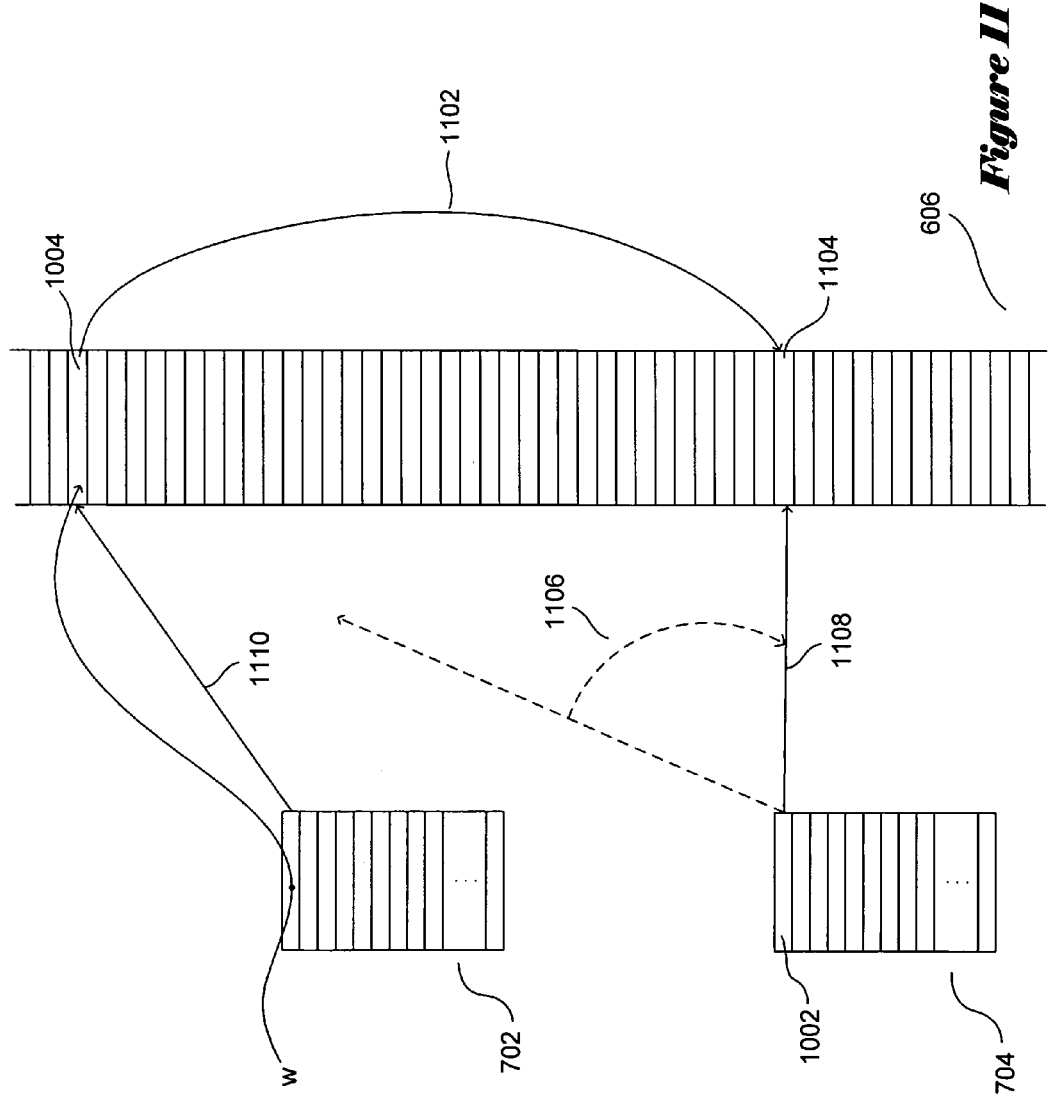
Figure 12:
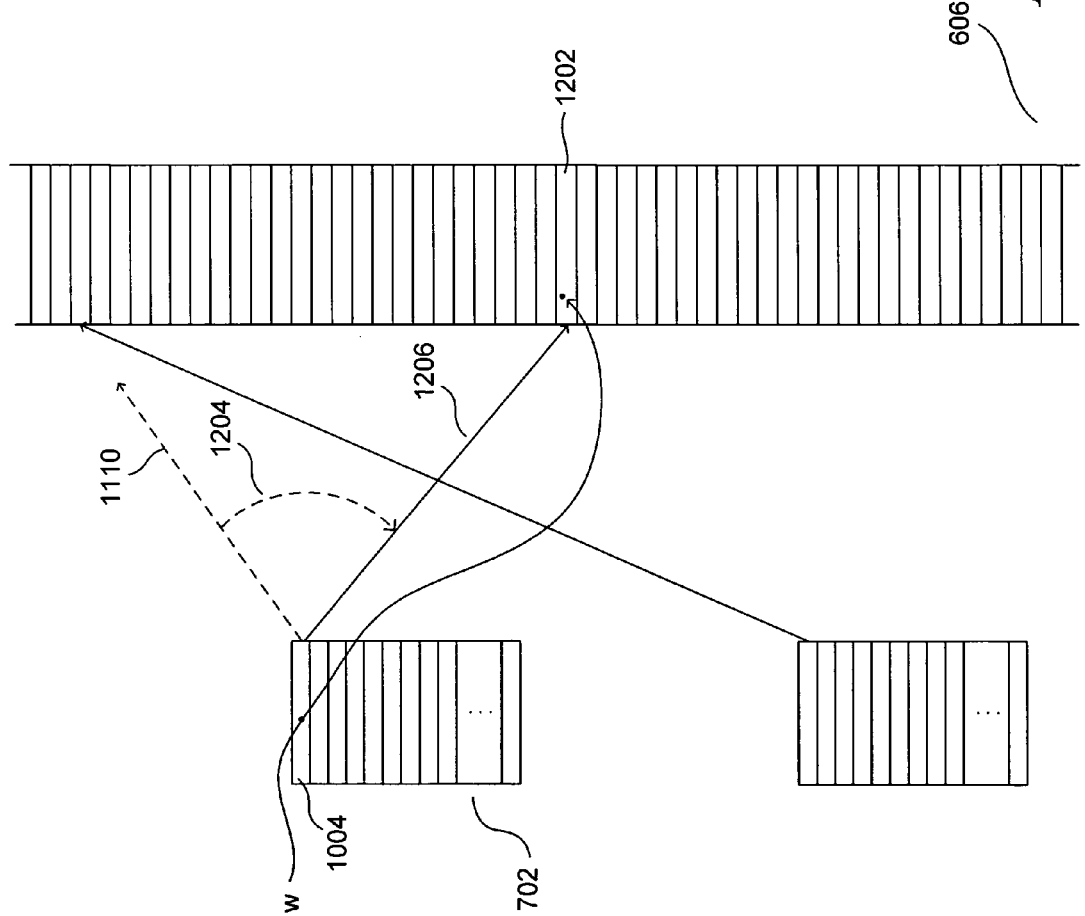

The second, deferred-copying snapshot operation is generally employed in currently available arrays. READ operations directed either to the original logical unit or the snapshot logical unit, following the snapshot operation, are carried out in exactly the same manner by the array controller as READ operations directed to the original logical unit prior to the snapshot, using the mappings associated with the original logical unit and snapshot logical unit. However, WRITE operations are somewhat modified. FIGS. 10-12 illustrate a WRITE operation directed to a block of an original logical unit following a snapshot operation. As shown in FIG. 10, the first block 1002 of the snapshot logical unit 704 is mapped to the same logical block 1004 as the first block 1005 in the original logical unit 702. Thus, the first block of the original logical unit 702 has not been overwritten following the snapshot operation. At this point, consider a WRITE operation 1006 directed to the first block 1004 of the original logical unit 702. Two different approaches may be used to carry out this WRITE operation. It should be noted that the new data associated with the WRITE operation needs to be stored within the array in association with the original logical unit 702, while the existing data associated with the first block of both the original logical unit 702 and the snapshot logical unit 704 needs to remain stored within the array in association with the snapshot logical unit. Thus, although the deferred-copying snapshot operation shown in FIG. 9 allows for fast initial execution, the initially deferred copying is carried out, in some fashion, during execution of WRITE operations directed either to the original logical unit or the snapshot logical unit following the snapshot operation, when the target block of the WRITE operation is first rewritten.

In one method, shown in FIG. 11, for carrying out the WRITE operation discussed with reference to FIG. 10, referred to as the "copy-on-write" method, the data originally associated with the first block prior to the snap operation 1004 is copied 1102 to a newly allocated block 1104 in logical-block-address space 606, and the mapping for snapshot-logical-unit 704 for the first block is changed 1106 so that the first block 1002 of the snapshot logical unit 704 is mapped 1108 to the newly allocated logical-block 1104 to which the original data was copied. Then, the WRITE operation can be carried out with respect to the original mapping 1110 to the logical block 1004 in which the original data was stored.

In a second technique, illustrated in FIG. 12, referred to as the "allocate-on-write" method, a new block 1202 is allocated in logical-block address space 606, and the original mapping 1110 for the first block in the original logical unit 702 is changed 1204 to reference 1206 the newly allocated block. Then, the WRITE operation is carried out with respect to the modified mapping 1206 for the first block 1004 of the original logical unit 702.

In general, the allocate-on-write method, shown in FIG. 12, is preferred for virtual arrays. This method avoids the copy operation (1102 in FIG. 11) associated with the copy-on-write method. However, there may be cases in which the copy-on-write method is preferred, particularly when data locality needs to be preserved for snapshot-logical-unit data blocks, and writes to the snapshot copy occur much more frequently than writes to the original logical unit. In such cases, the allocate-on-write method is used for WRITE operations directed to the snapshot logical unit, while the copy-on-write method is used for WRITE operations directed to the original logical unit.

Array-Cluster-Based Embodiments of the Present Invention

Figure 13:
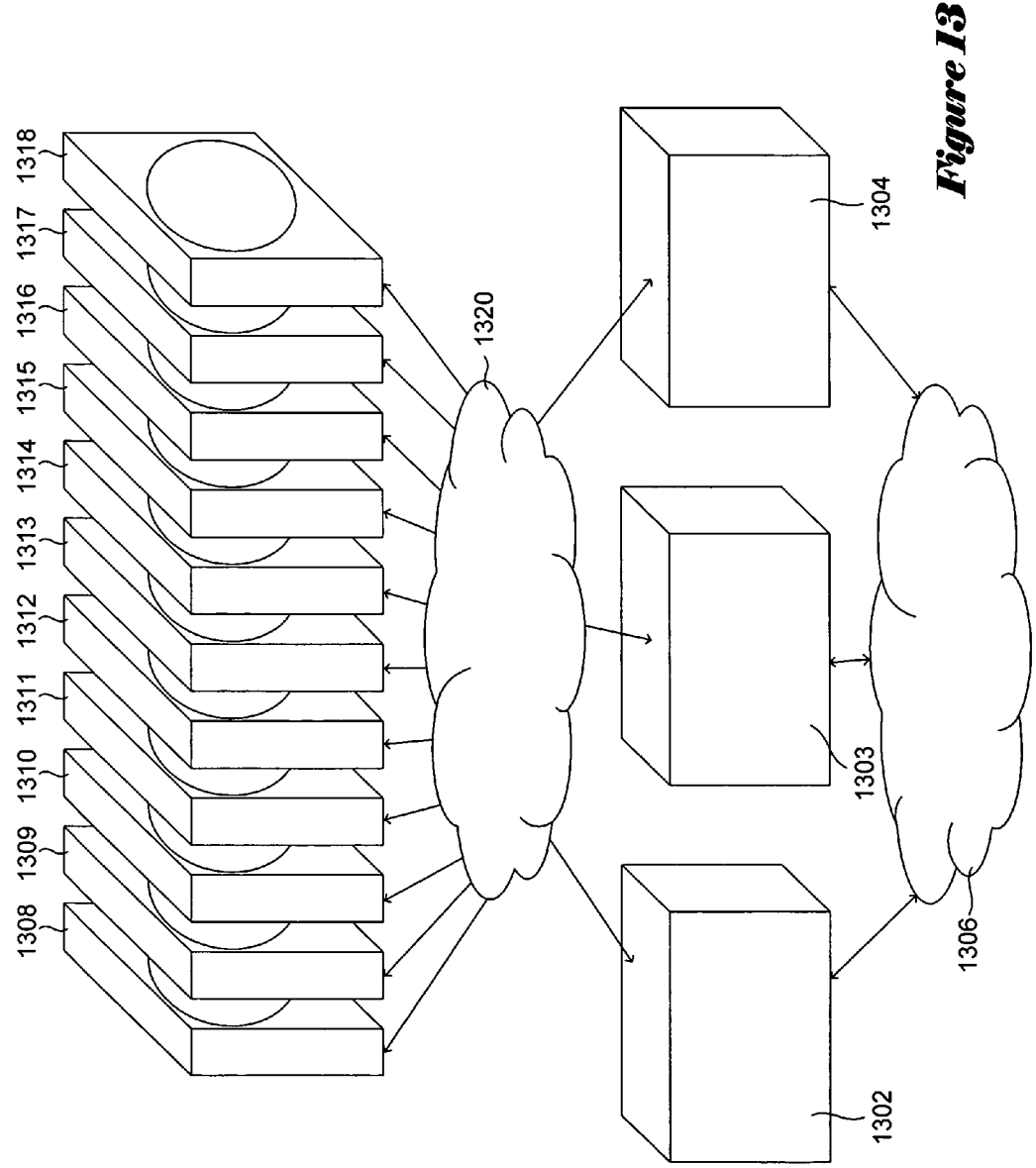
FIG. 13 is an abstract illustration, using illustration conventions used in FIG. 1, of an array cluster.
Figure 14:
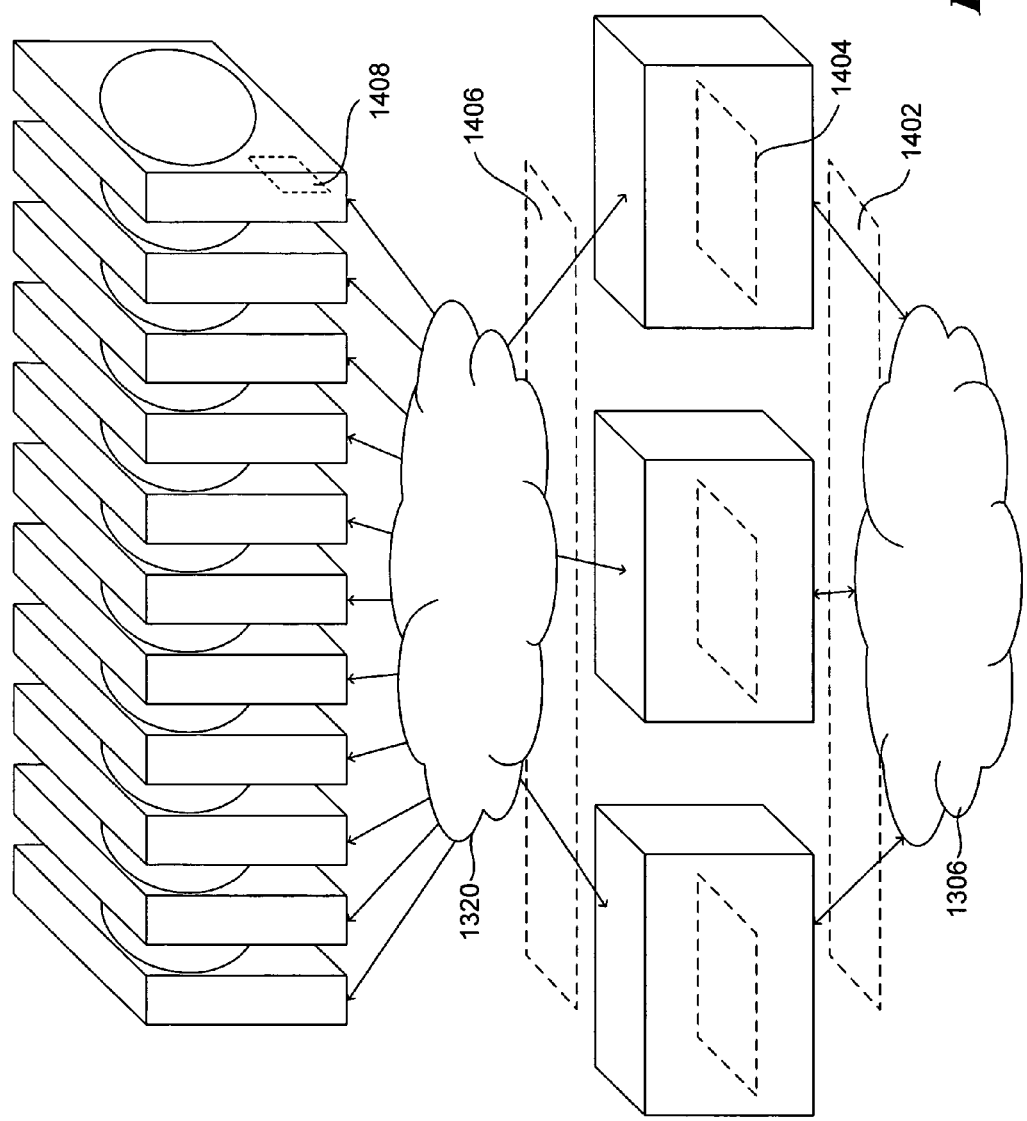
FIG. 14 shows various mappings in the array cluster in similar fashion to illustration of the mappings in a traditional array shown in FIG. 2.

FIG. 13 is an abstract illustration of an array cluster, and uses illustration conventions used in FIG. 1. An array cluster comprises multiple array controllers 1302-1304 that are accessed by host computers via a first communications medium 1306 and that, in turn, access a number of commonly shared mass-storage devices 1308-1318 via a second communications medium 1320. In certain circumstances, the first and second communications media may be a single communications medium. The array controllers in 1302-1304 may all access the same set of mass-storage devices 1308-1318, in certain implementations, or, in other implementations, the array controllers may commonly access some number of mass-storage devices, while each array controller may access additional mass-storage devices individually, or subsets of the array controllers may commonly access additional mass-storage devices. In alternative implementations, the array controllers may not commonly access any mass-storage devices, but, instead, each array controller may be responsible for accessing a separate set of mass-storage devices. FIG. 14 shows various mappings in the array cluster in similar fashion to illustration of the mappings in a traditional array shown in FIG. 2. The illustrated mappings include a mapping 1402, based on the network address space associated with communications media 1306, of logical units to array controllers, internal mappings, such as mapping 1404, within array controllers that map logical units to logical blocks within mass-storage devices, a mapping 1406 that maps array controllers to network addresses within the second communications medium 1320, and the mappings 1408 within mass-storage devices of logical blocks to physical blocks.

Figure 15:
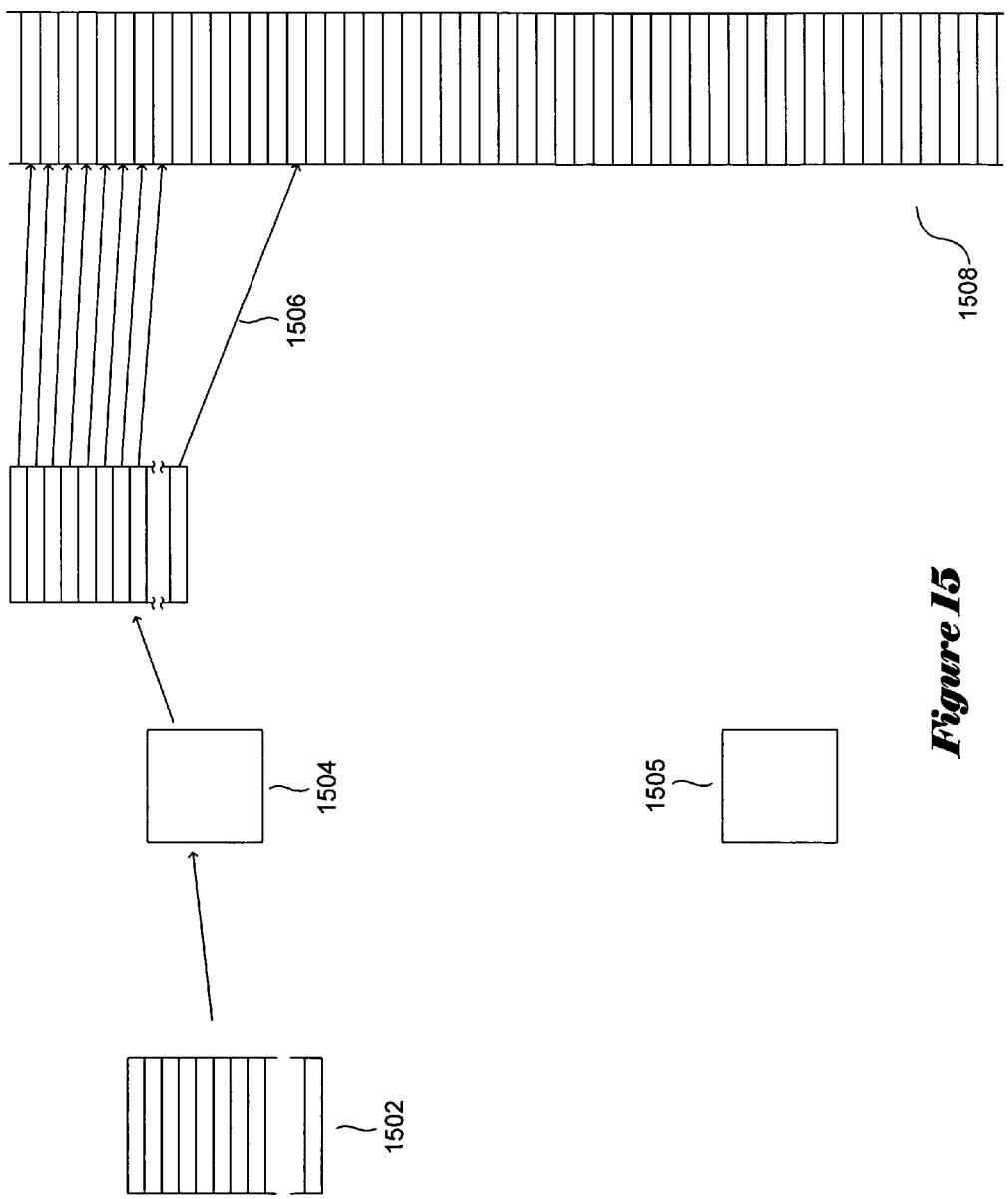
FIG. 15 shows the abstraction level at which array clusters are discussed, below, in similar fashion to the abstraction level shown in FIG. 7 for traditional arrays.

FIG. 15 shows the abstraction level at which array clusters are discussed, below, in similar fashion to the abstraction level shown in FIG. 7 for traditional arrays. As shown in FIG. 15, a logical unit 1502 is associated with an array controller 1504 selected from among the array controllers 1504-1505 within a cluster. The array controller 1504 maps 1506 the logical unit to logical-block-address space 1508.

Figure 16:
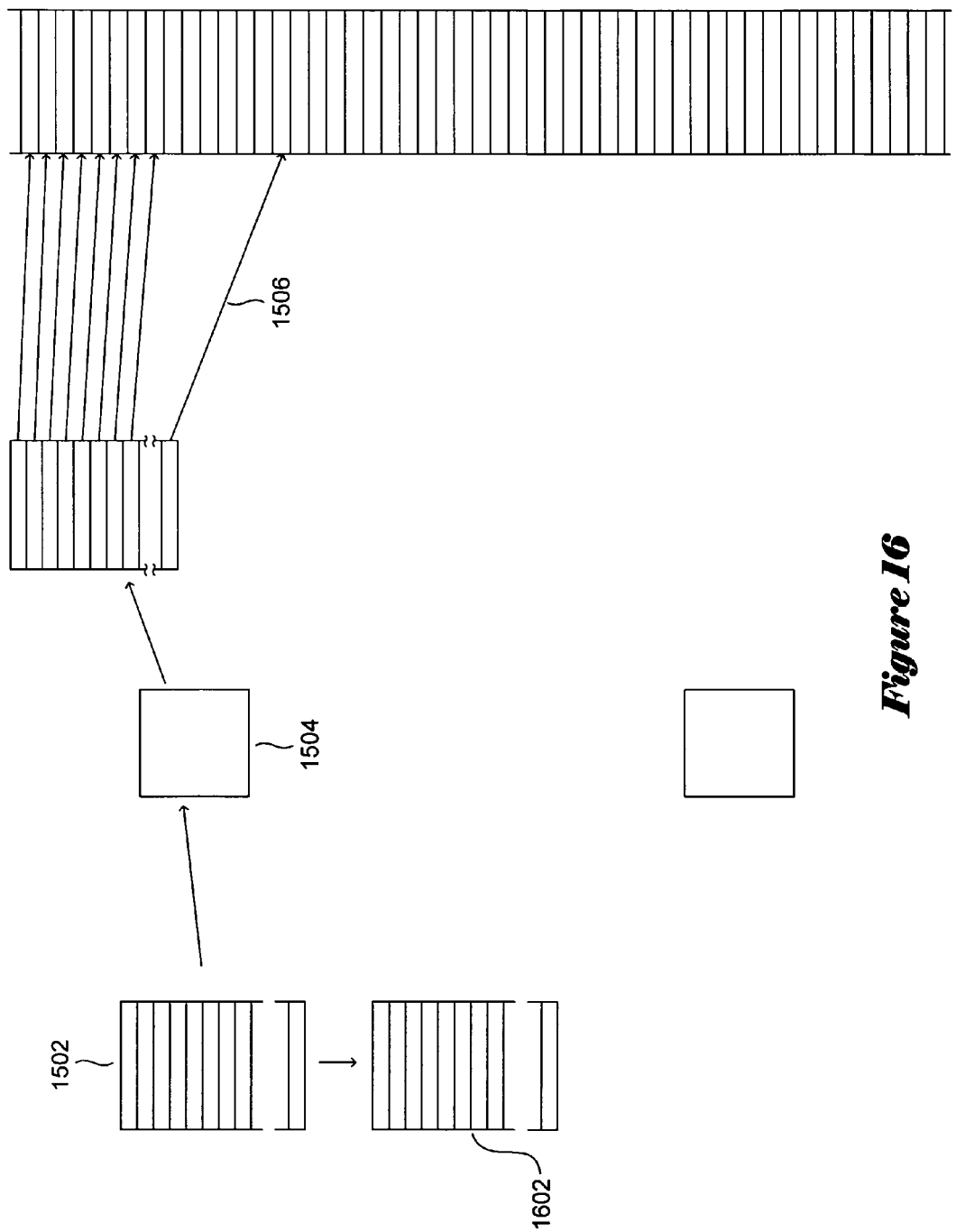
FIG. 16 illustrates a snapshot operation with respect to a logical unit provided by an array cluster.

FIG. 16 illustrates a snapshot operation with respect to a logical unit provided by an array cluster. As shown in FIG. 16, a host computer may direct the array controller 1504 associated with an original logical unit 1502 to replicate, or copy, that logical unit to a snapshot logical unit 1602 via a snapshot operation.

Figure 17:
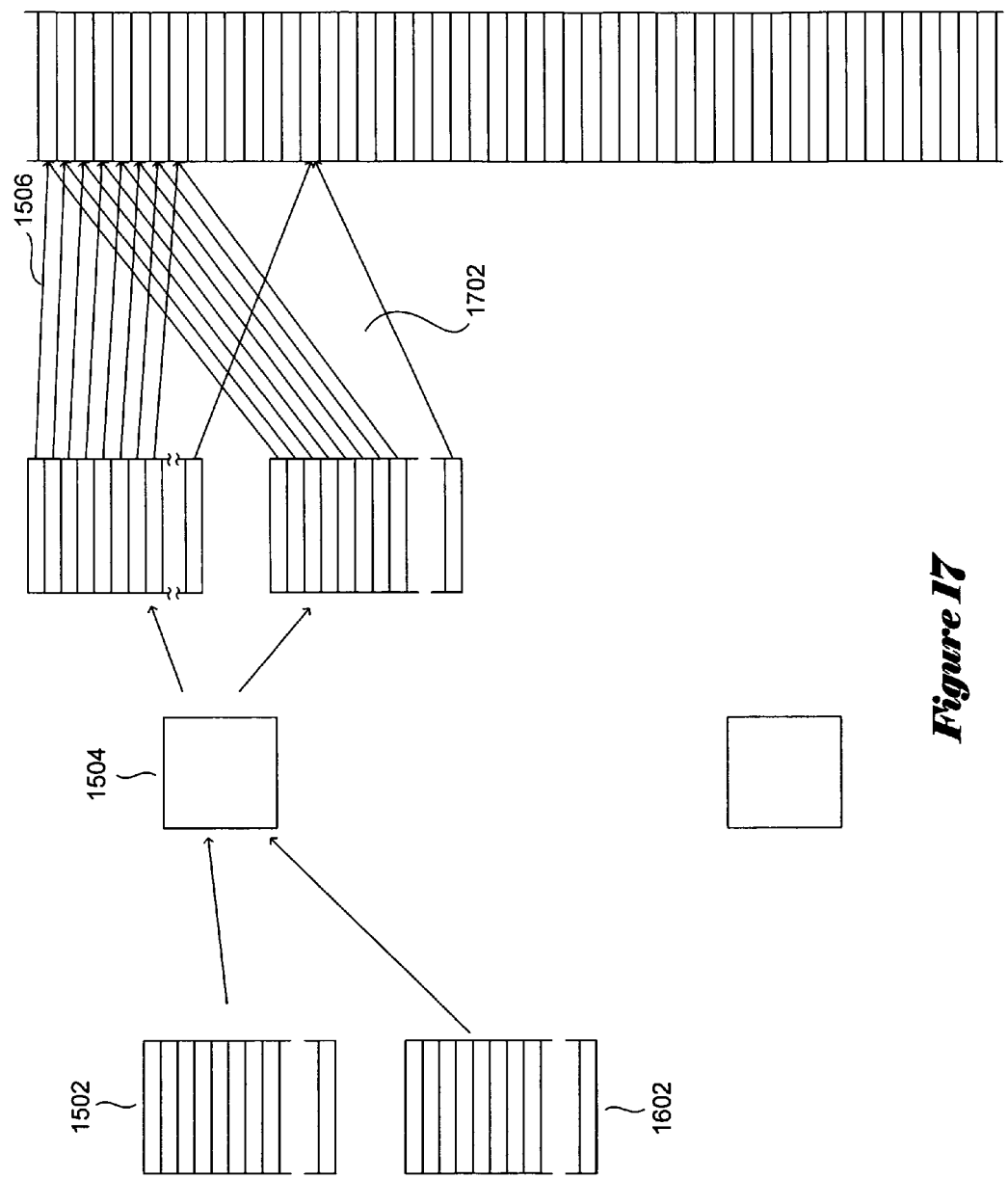
FIGS. 17-21 illustrate a variety of different types of snapshot-operation implementations that may be carried out in an array cluster, many of which represent embodiments of the present invention.

FIGS. 17-21 illustrate a variety of different types of snapshot-operation implementations that may be carried out in an array cluster, many of which represent embodiments of the present invention. As shown in FIG. 17, the snapshot operation may be implemented by carrying out a deferred-copying snapshot operation by the array controller 1504 originally associated with the original logical unit 1502. Access operations to both the original logical unit 1502 and the snapshot copy 1602 are directed to the original controller 1504, which replicates the original mapping 1506 to create a replicated mapping 1702 that is associated with the snapshot logical unit 1602. The snapshot-operation implementation shown in FIG. 17 is the snapshot-operation implementation that is currently used within array clusters. However, this snapshot-operation implementation has certain drawbacks. First, all access operations directed both to the original logical unit and the snapshot logical unit are directed to a single array controller. If both the original logical unit and the snapshot logical unit are subsequently accessed with relatively high frequency, the additional load represented by the sum of the loads associated with the original logical unit and snapshot logical unit is borne entirely by a single array controller, potentially overloading the single array controller. Moreover, while arrays and cluster arrays redundantly store data in different mass-storage devices or striped across multiple mass-storage devices, in order to recover from failure of a particular array controller, and generally provide for all stored data to be accessible despite mass-storage-device failures or array-controller failures, the array-controller-failure-recovery process may be time consuming. In the snapshot-operation implementation shown in FIG. 17, should array controller 1504 fail, then both the original logical unit and snapshot logical unit may be unavailable or access to the snapshot logical unit may be degraded for a significant period of time, prior to repair or replacement of the array controller or error recovery by remaining array controllers of the array cluster.

Figure 18:
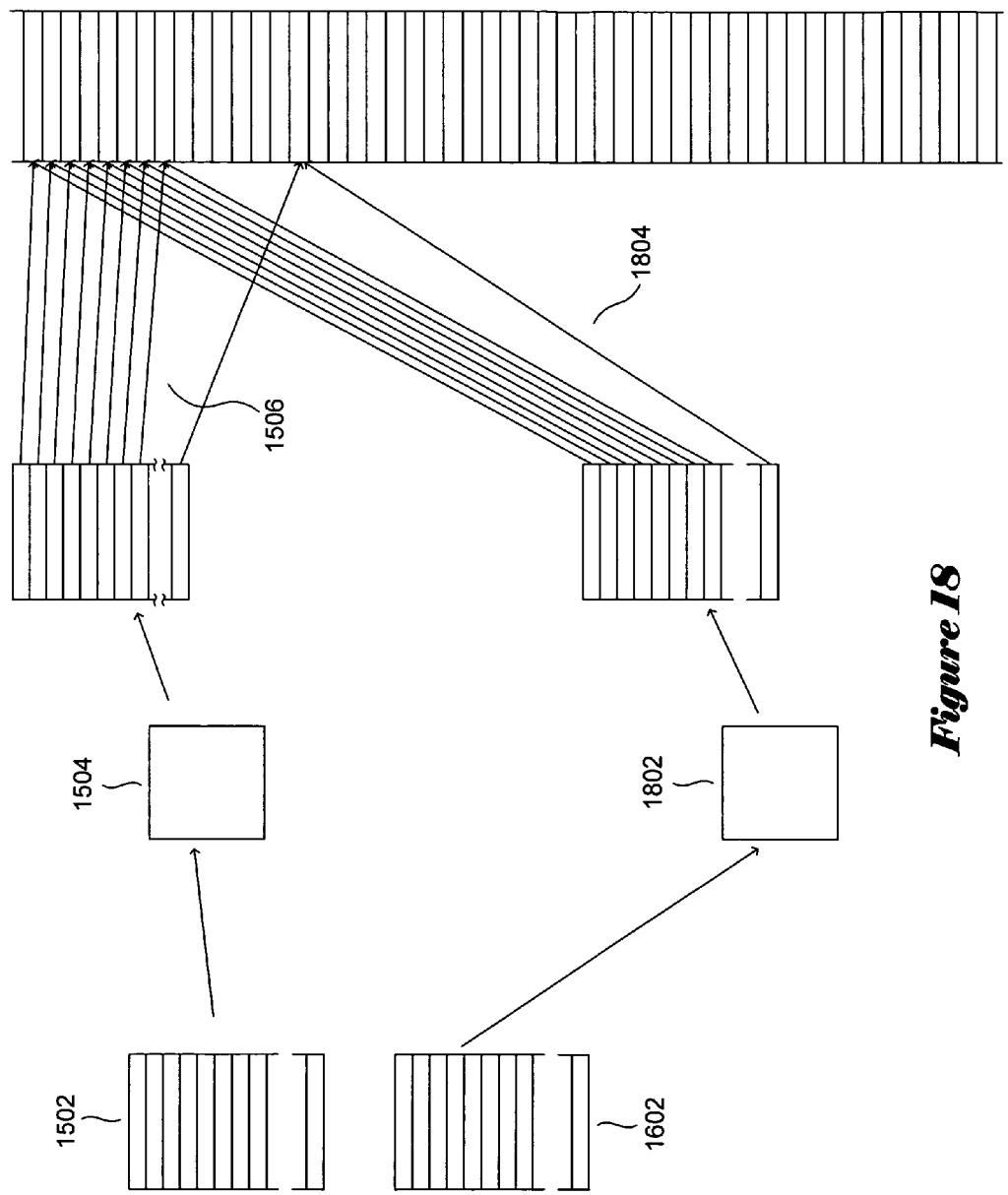

For these reasons, embodiments of the present invention distribute the original logical unit and snapshot logical unit across multiple array controllers within an array cluster. FIG. 18 illustrates one embodiment of the present invention. As shown in FIG. 18, the original logical unit 1502 remains associated with the original array controller 1504, while the snapshot logical unit 1602 is associated with a different array controller 1802. Initially, the additional array controller 1802 is provided a copy 1804 of the original mapping 1506 of the original logical unit. Over time, the two mappings 1506 and 1804 diverge, as blocks in the original logical unit and/or snapshot logical unit are overwritten. Unfortunately, in many cases, requiring host computers to access the snapshot logical unit through a different array controller than the array controller through which the original logical unit is accessed may be unacceptable. For this reason, alternative embodiments of the present invention provide for access to the original logical unit and the snapshot logical unit through a single controller. Moreover, in this embodiment, and in the next discussed embodiment, both the original array controller and the additional array controller maintain common mappings, at least initially, so that these common mappings are essentially distributed, and require sophisticated techniques for distributed management of distributed data.

Figure 19:
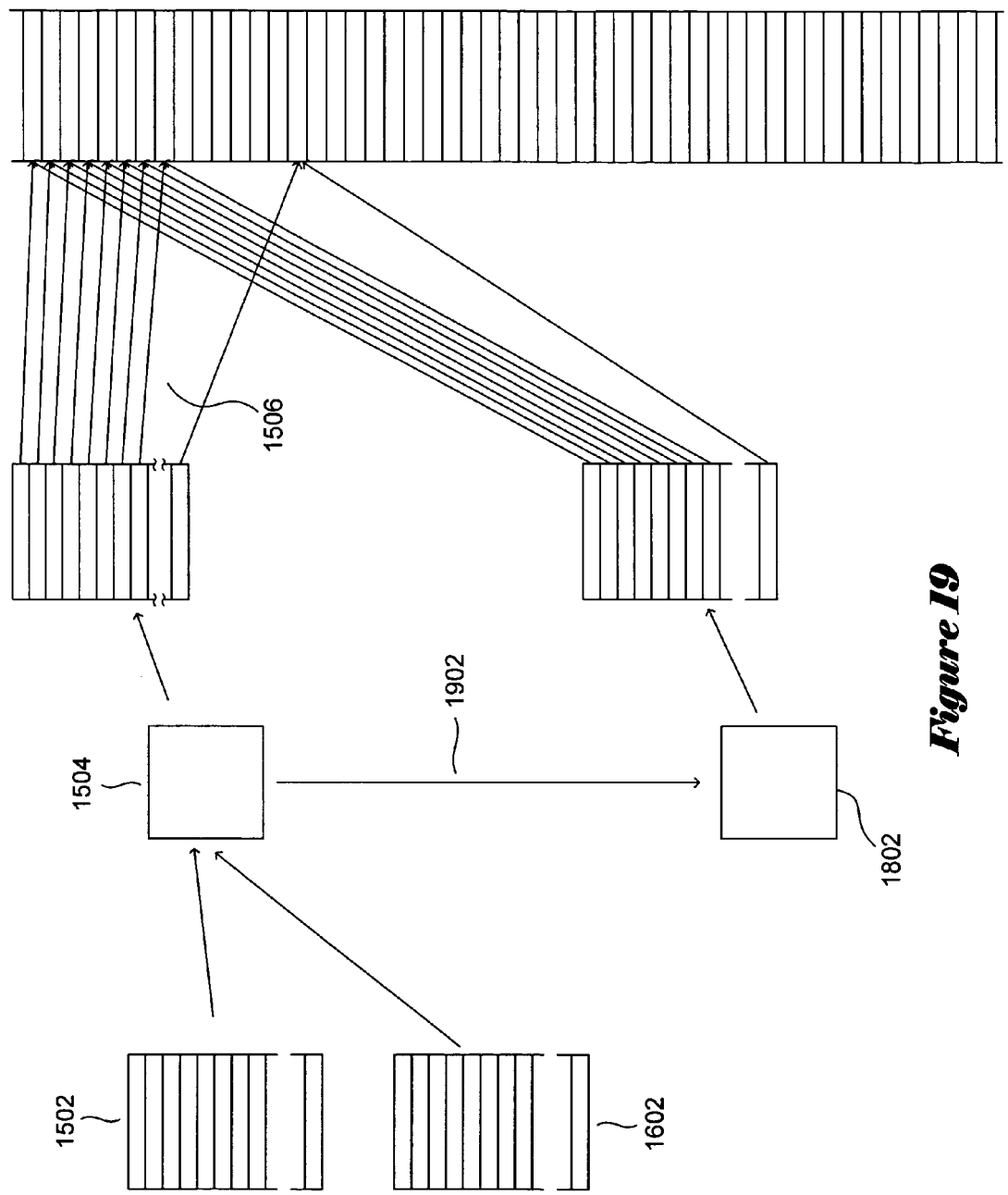

FIG. 19 shows a single-array-controller access point for both an original logical unit and a snapshot logical unit, according to one embodiment of the present invention. FIG. 19 is similar to FIG. 18, with the exception that access operations addressed to the original logical unit 1502 and snapshot logical unit 1602 are both directed to the original array controller 1504, with the original array controller forwarding access operations directed to the snapshot logical unit 1902 to the second array controller 1802. In most cases, the results are returned by the second array controller 1802 to the first array controller, which then forwards the results to the host computer. In alternative implementations, the second array controller may return the results directly to the host computer. In the remaining discussion, the return path for results from access-operation execution is not specifically addressed, because multiple different return paths may be possible. This second, alternative embodiment of the present invention may be preferred over the first embodiment of the present invention shown in FIG. 18. Two additional embodiments of the present invention rely on deferred mapping migration between array controllers.

Figure 20:
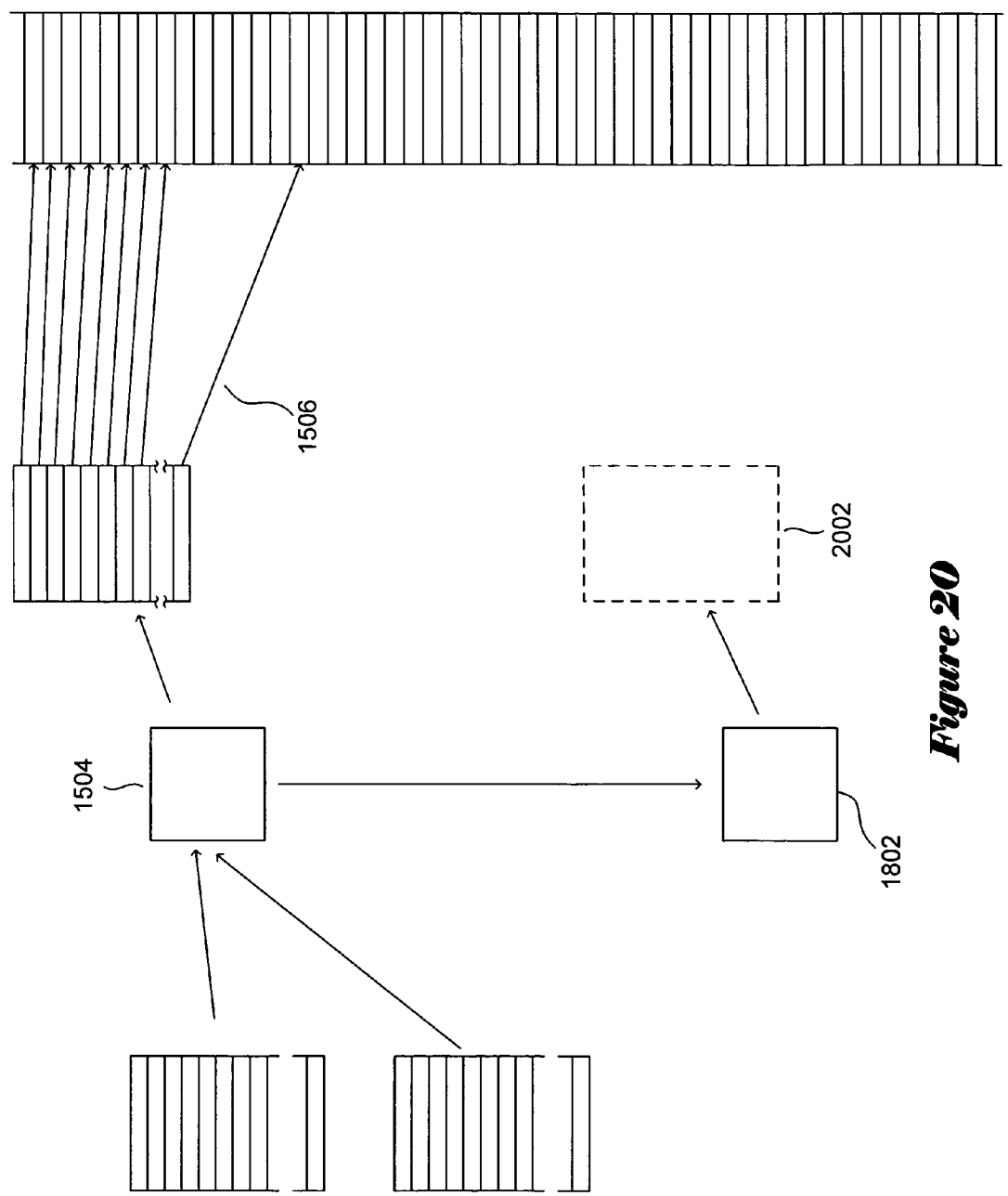
Figure 21:
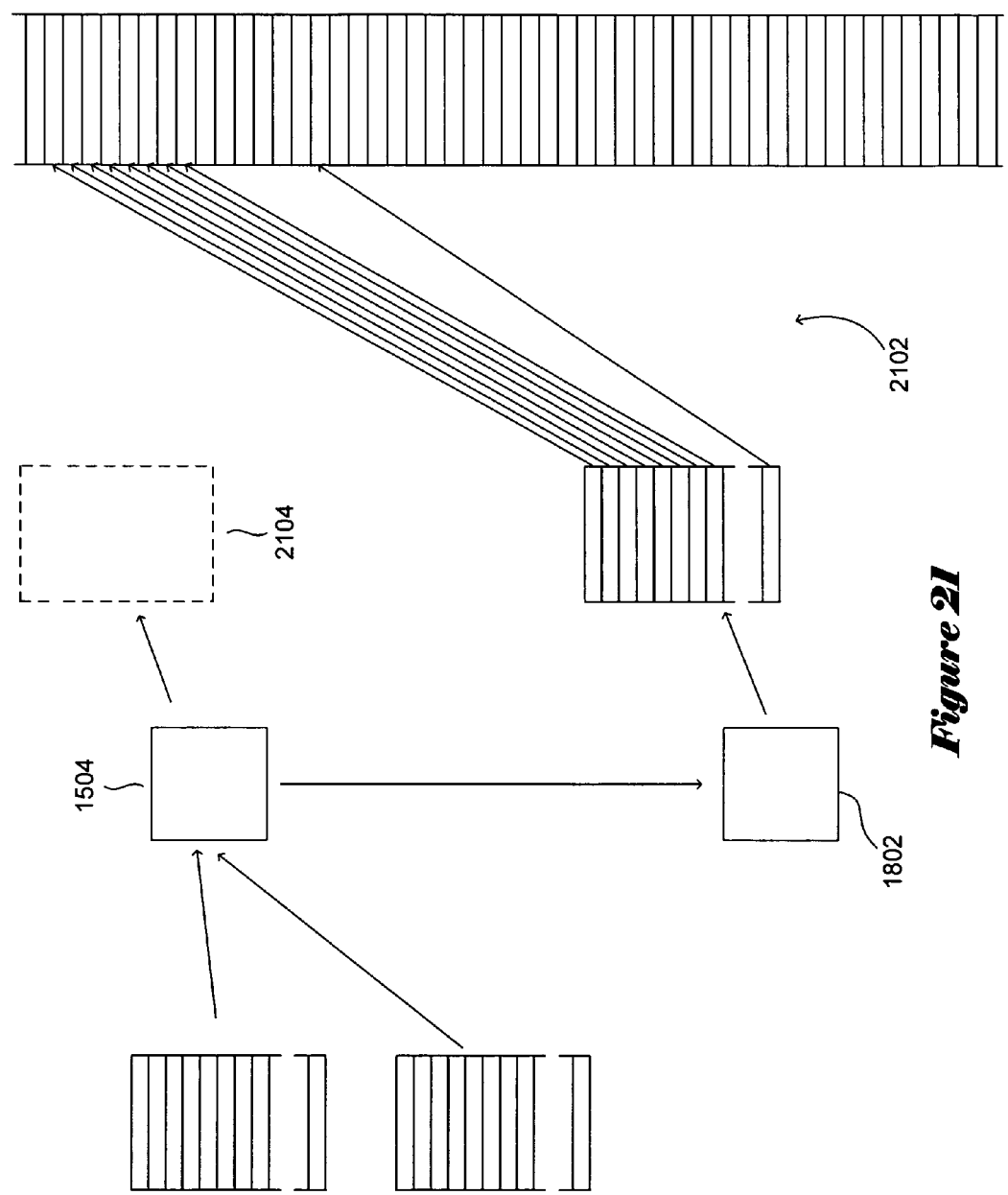

FIG. 20 shows a first, deferred-map-copying embodiment of the present invention in which the original mapping 1506 is retained by the original array controller 1504, and provision is made on the second array controller 1802 for developing, over time, mapping 2002 to newly allocated logical blocks associated with the snapshot copy. FIG. 21 shows a similar embodiment of the present invention, in which the original mapping for the original logical unit is transferred 2102, in its entirety, to the new array controller 1802 while provision 2104 is made on the original controller 1504 for generating new mappings for newly allocated blocks as original-logical-unit and snapshot-logical-unit blocks are overwritten, following the snapshot operation. The embodiment shown in FIG. 21 is described, in further detail, below, as exemplary of the many different possible embodiments of the present invention.

Figure 22:
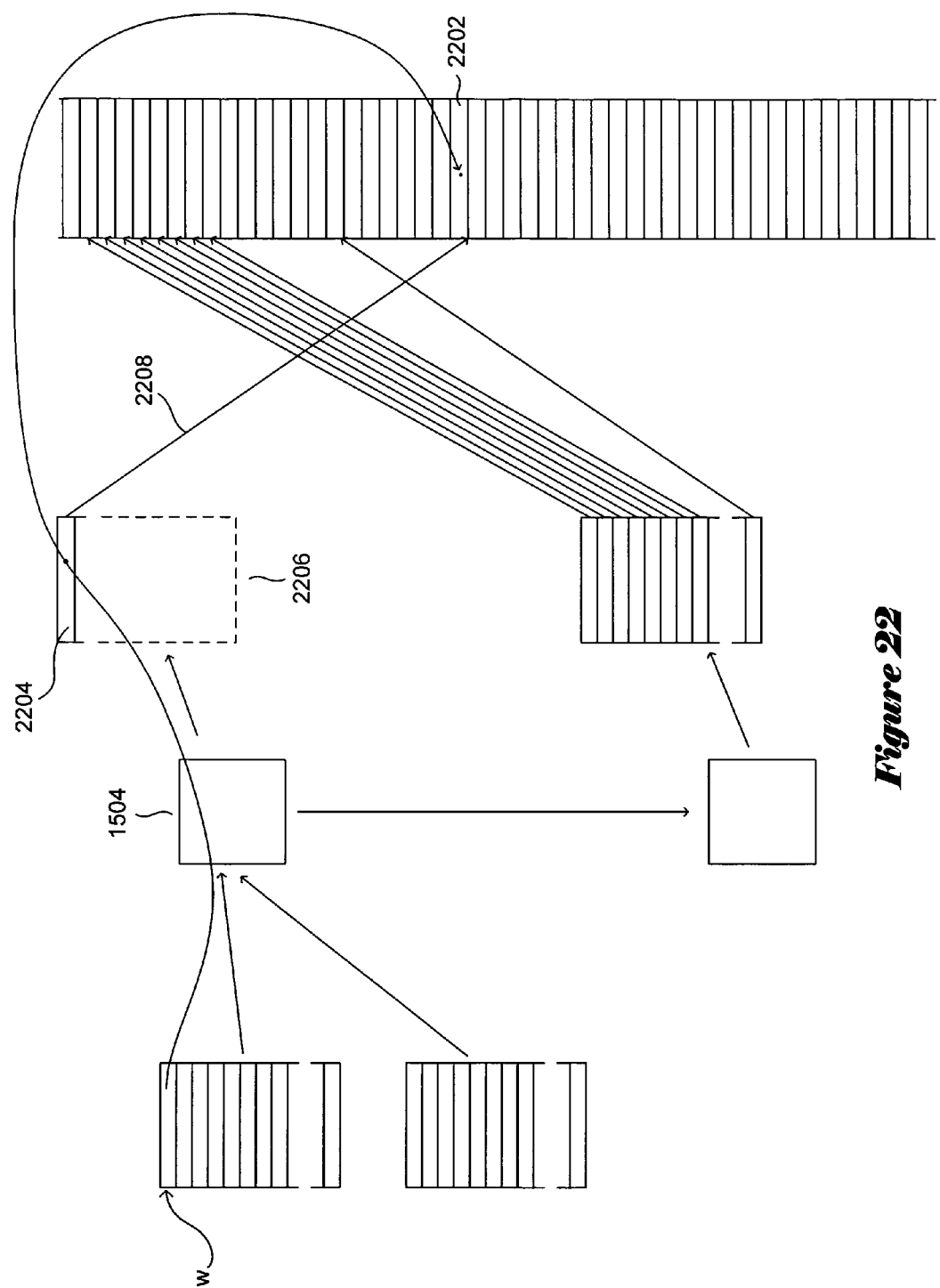
FIG. 22 shows a first implementation of a WRITE operation directed to the first block of the original logical unit after the snapshot operation shown in FIG. 21 according to an embodiment of the present invention.

FIG. 22 shows a first implementation of a WRITE operation directed to the first block of the original logical unit after the snapshot operation shown in FIG. 21, according to an embodiment of the present invention. The WRITE operation is directed to the original array controller 1504, which allocates a new logical block 2202 for the WRITE operation, establishes a new reference 2204 within the map 2206 associated with the first controller 1504 for the original logical unit to reference 2208 the newly allocated block 2202, and then proceeds to execute the WRITE operation with respect to the modified map 2206, in normal fashion. Please note that, for descriptive economy, the term "map" is applied to the internal logical unit 2206 shown in the figures, as well as to the arrows in the figures representing references to particular logical blocks contained in the internal logical unit.

Figure 23:
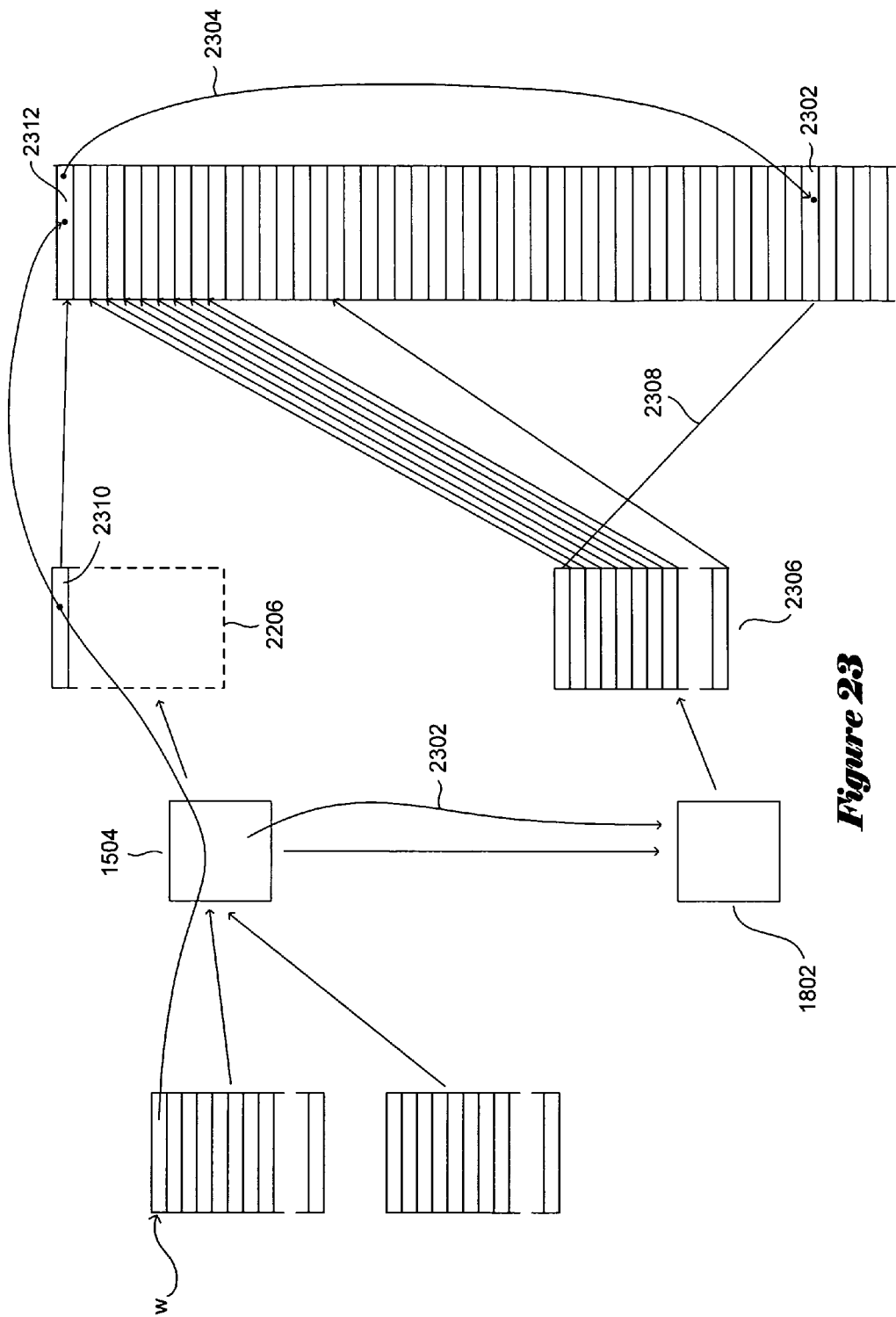
FIG. 23 shows a second implementation of the WRITE operation shown in FIG. 22 according to an embodiment of the present invention.

FIG. 23 shows a second implementation of the WRITE operation shown in FIG. 22, according to an embodiment of the present invention. In this case, the first controller 1504 directs 2302 the second controller 1802 to allocate a new block 2302 for the first block of the snapshot logical unit, copy 2304 the original block to the new block, alter the map 2306 for the snapshot logical unit to reference 2308 the newly allocated block, after which the first controller alters the map 2206 for the original logical unit to include a reference 2310 for the first block to the original data block 2312, and then carries out the WRITE operation with respect to the altered map.

The implementation shown in FIG. 22 represents an allocate-on-write operation analogous to the allocate-on-write operation for traditional arrays, while the implementation shown in FIG. 23 represents a copy-on-write implementation analogous to the copy-on-write implementation for traditional arrays. Similarly, writes directed to snapshot-logical-unit blocks not overwritten following the snapshot operation may involve either allocate-on-write methods or copy-on-write methods. Whether allocate-on-write methods or copy-on-write methods are employed for writing to the original logical unit and snapshot logical unit depends on the frequency and nature of WRITE accesses subsequently directed to the original logical unit and snapshot logical unit, the overall load of an array cluster, individual loads on individual array controllers within the array cluster, data-locality constraints, current data allocation patterns within the logical-block address space within the array, and many other factors and both short-term and long-term characteristics of the array cluster. Although it is not possible to list, and separately describe, the various permutations of these parameters and considerations and associated preferred type of WRITE operations, embodiments of the present invention do provide sufficient flexibility in implementation to allow snapshot-operation implementations to be tailored, both initially and adaptively, over time, to the initial and dynamically changing characteristics of an array cluster.

Figure 24:
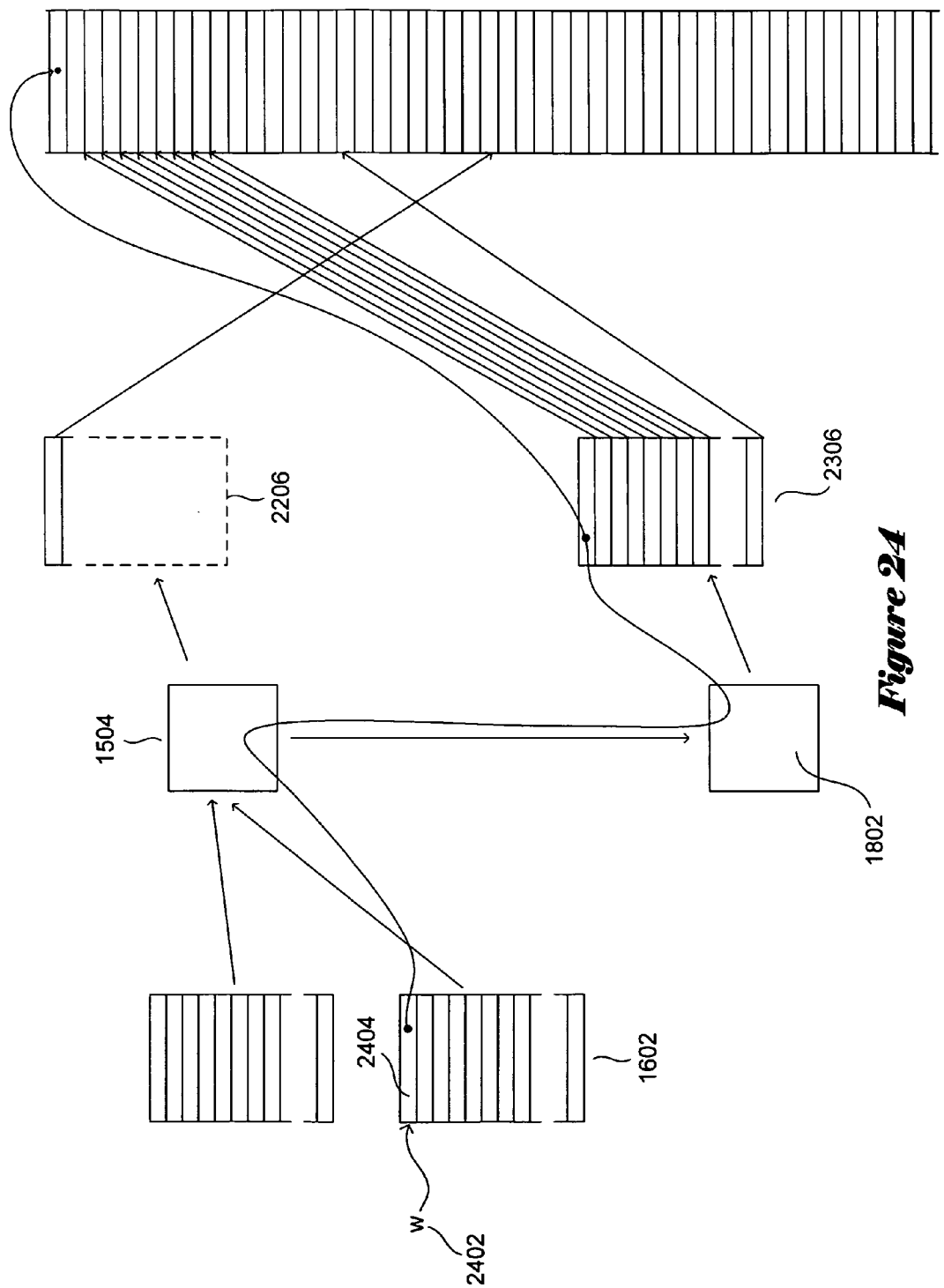
FIG. 24 illustrates a WRITE operation directed to a snapshot-logical-unit block that has already been overwritten following the snapshot operation that created the snapshot logical unit according to an embodiment of the present invention.

FIG. 24 illustrates a WRITE operation directed to a snapshot-logical-unit block that has already been overwritten following the snapshot operation that created the snapshot logical unit, according to an embodiment of the present invention. As shown in FIG. 24, the WRITE operation 2402 is directed to the first block 2404 of the snapshot logical unit 1602. The WRITE operation is submitted to the original array controller 1504, which determines that the block to which the WRITE operation is directed has been previously overwritten, following the snapshot operation, in either the original logical unit or the snapshot logical unit. In this case, the WRITE operation is forwarded to the second array controller 1802 for execution by the second array controller 1802 with respect to the map 2306 associated with the snapshot logical unit. Similarly, but not shown in the figures, a WRITE operation directed to an original logical unit block, already overwritten can be carried out by the original array controller 1504 with respect to the map 2206 associated with the original logical unit. The original logical unit block may have been overwritten either as a result of a WRITE operation directed to the original logical unit or as a result of a WRITE operation directed to the snapshot logical unit, since, in either case, the original logical unit and snapshot logical unit will have diverged from one another, so that the logical block is not referenced by both mappings.

Figure 25:
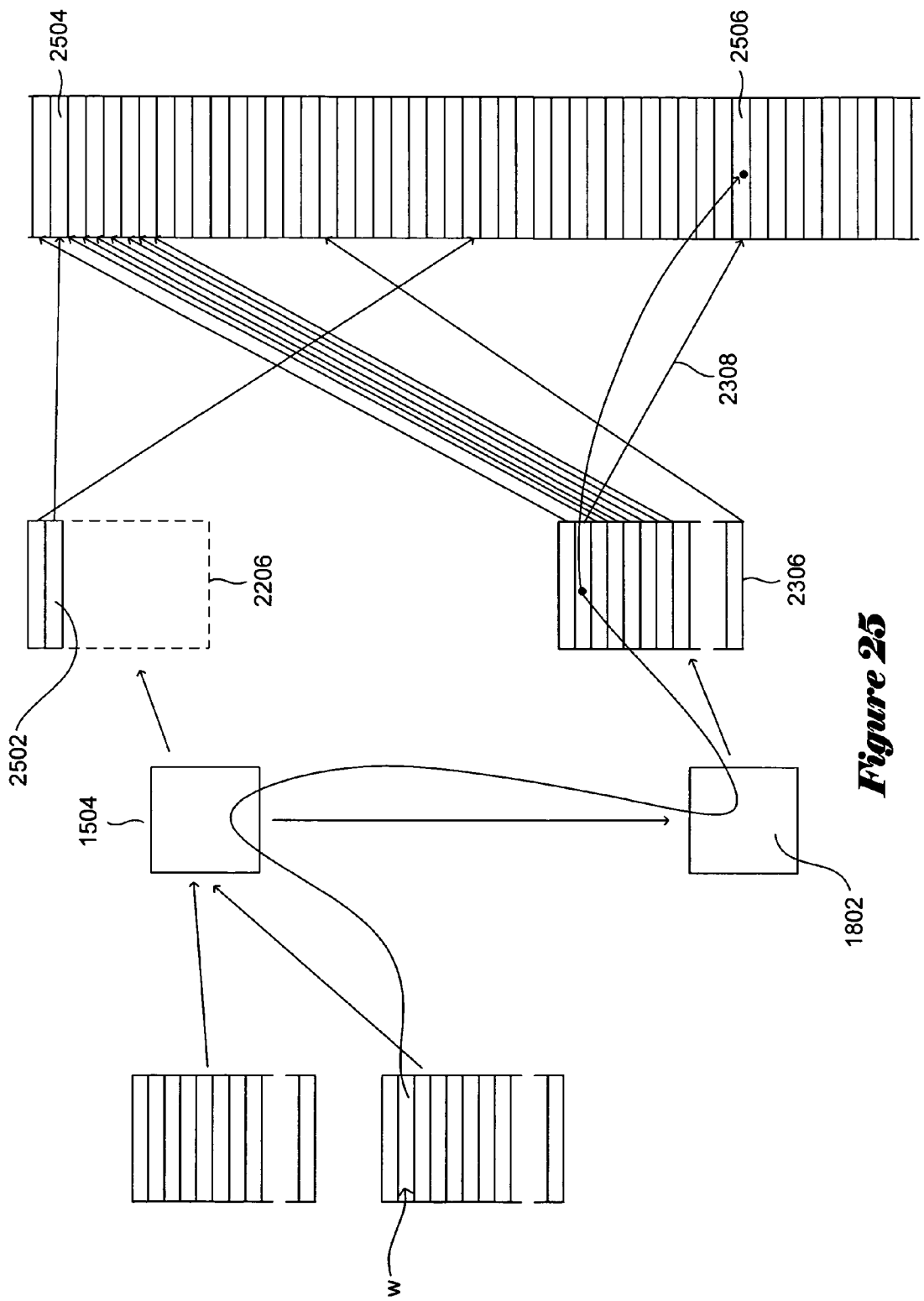
FIGS. 25 and 26 illustrate WRITE operations directed to a block within the snapshot logical unit that has not yet been overwritten as a result of WRITE operations directed to either the original logical unit or snapshot logical unit, according to an embodiment of the present invention.
Figure 26:
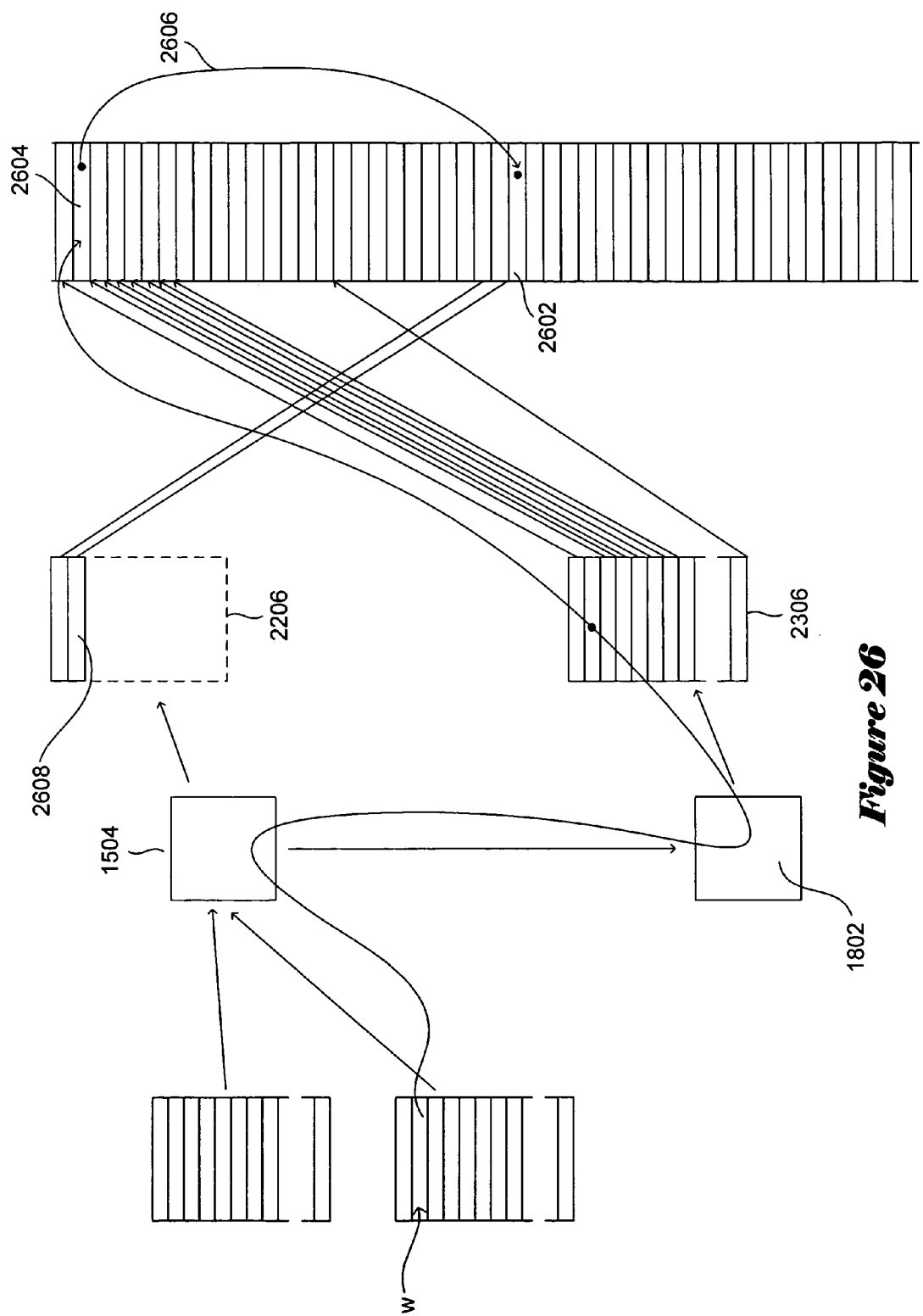

FIGS. 25 and 26 illustrate WRITE operations directed to a block within the snapshot logical unit that has not yet been overwritten as a result of WRITE operations directed to either the original logical unit or snapshot logical unit, according to an embodiment of the present invention. FIG. 25 illustrates one implementation of this WRITE operation, and FIG. 26 represents an alternative implementation. As shown in FIG. 25, the original array controller 1504 may forward the WRITE operation to the new controller 1802, receiving back from the second array controller 1802 a reference for the block to be written. The original controller then creates an entry 2502 in the map for the original logical unit that references the original block 2504. The second controller allocates a new logical block 2506 for the WRITE operation, updates the map 2306 associated with the snapshot logical unit to reference 2308 the newly allocated logical block, and then carries out the WRITE operation with respect to the modified map 2306. Alternatively, as shown in FIG. 26, the original array controller 1504 may allocate a new logical block 2602, copy the original data 2604 for the WRITE operation to the new logical block 2606, and add an appropriate reference 2608 to the map 2206 for the original logical unit. Then, the original controller 1504 may forward the WRITE operation to the second controller 1802, which can execute the WRITE operation against the map 2306 associated with the snapshot logical unit. Thus, as shown in FIG. 25-26, WRITE operations directed to snapshot-logical-unit blocks not yet overwritten since the snapshot operation can be implemented by either allocate-on-write or copy-on-write methods.

Figure 27:
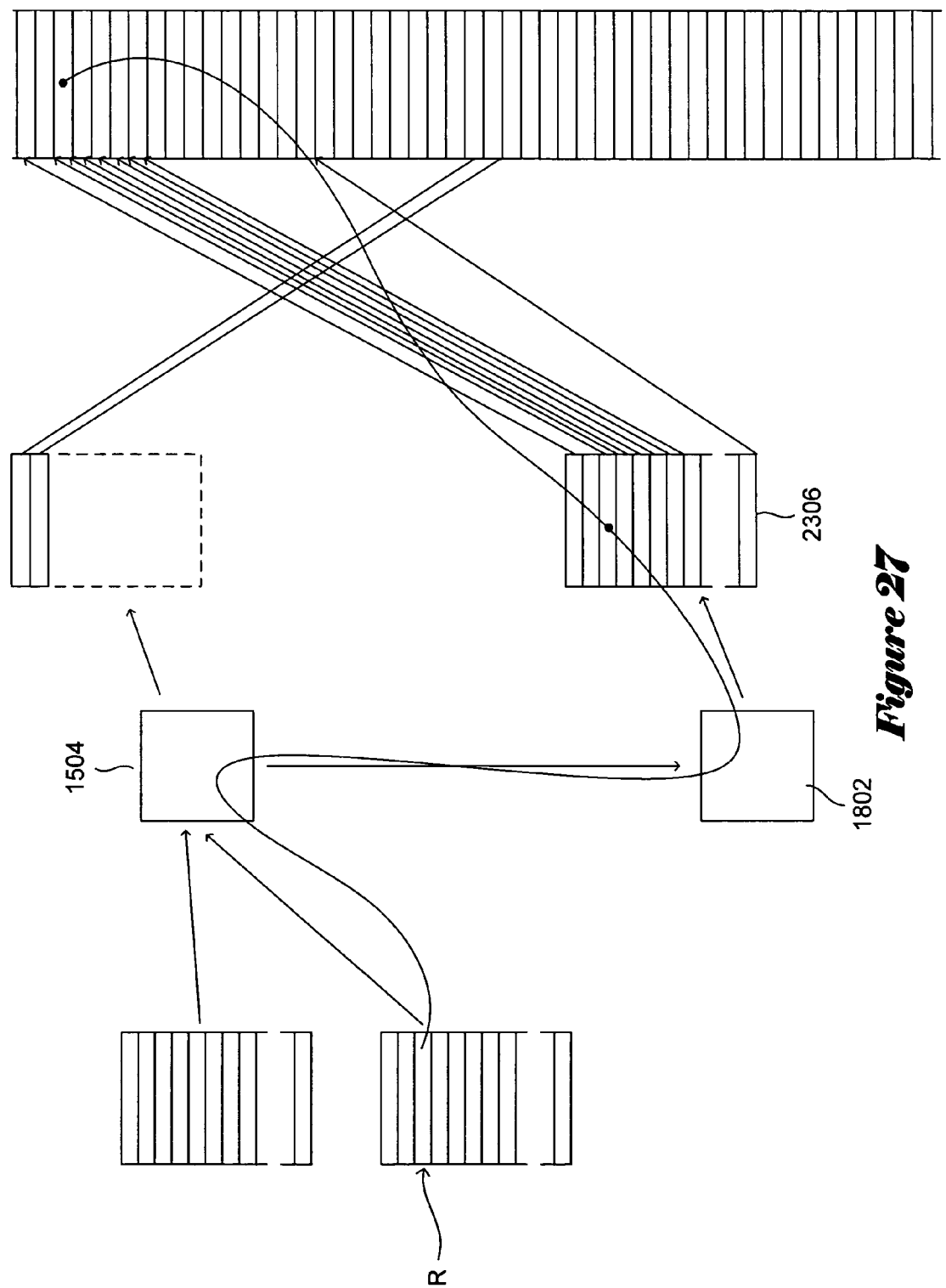
FIG. 27 illustrates a READ operation directed to a snapshot-logical-unit block that has not yet been overwritten since the snapshot operation, according to an embodiment of the present invention.

FIG. 27 illustrates a READ operation directed to a snapshot-logical-unit block that has not yet been overwritten since the snapshot operation, according to an embodiment of the present invention. The READ operation is forwarded by the original array controller 1504 to the new array controller 1802 for execution with respect to the map 2306 associated with the snapshot logical block. In similar fashion, READ operations directed to snapshot-logical-unit blocks that have been overwritten following the snapshot operation are forwarded to the second array controller for execution with respect to the map 2306 associated with the snapshot logical unit.

Figure 28:
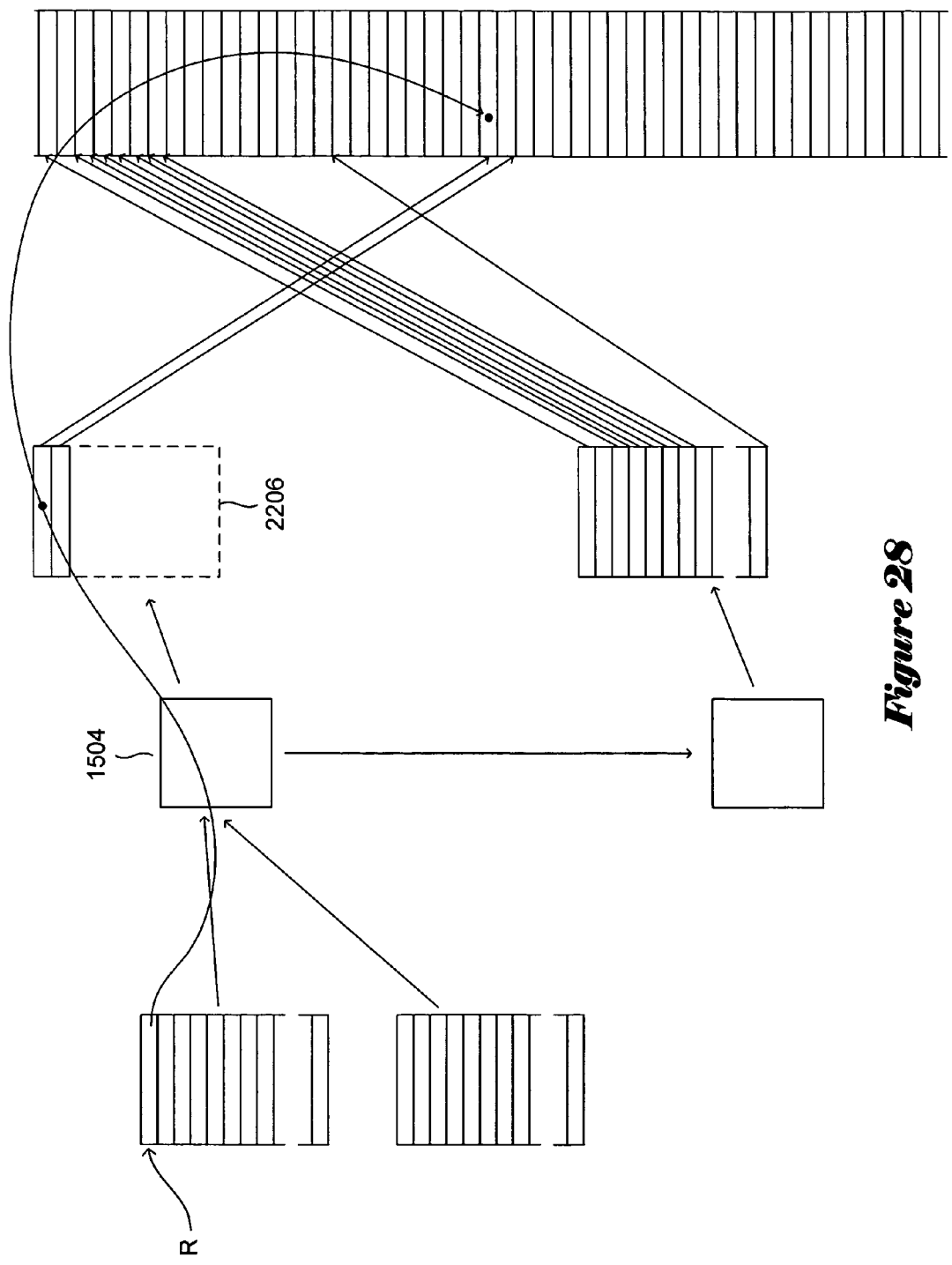
FIG. 28 shows a READ operation directed to an original-logical-unit block that has been overwritten since the snapshot operation, according to an embodiment of the present invention.

FIG. 28 shows a READ operation directed to an original-logical-unit block that has been overwritten since the snapshot operation, according to an embodiment of the present invention. As shown in FIG. 28, the READ operation is directed to the original array controller 1504 which executes the READ operation with respect to the map 2206 associated with the original logical unit.

Figure 29:
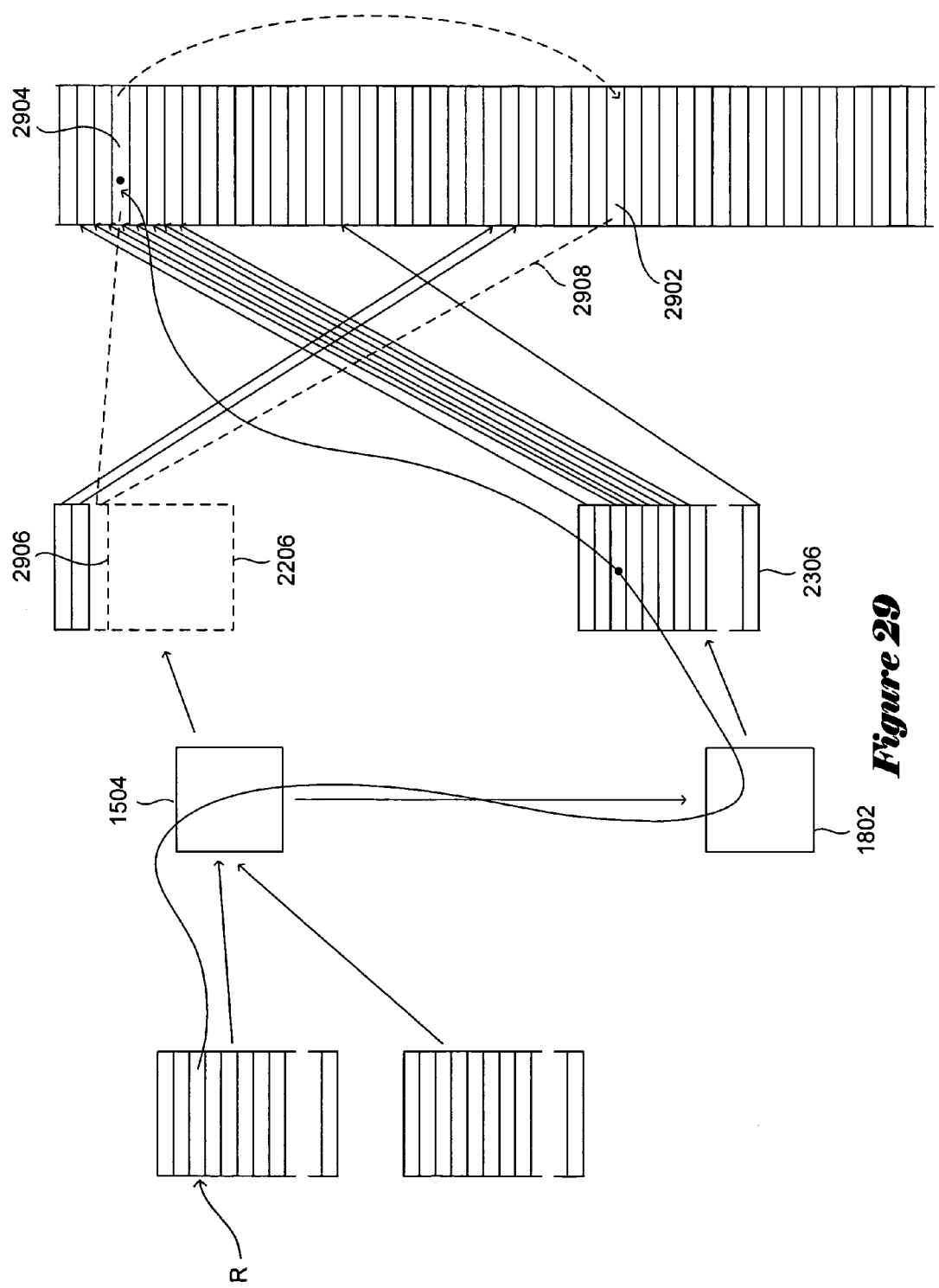
FIG. 29 shows a READ operation directed to a block within the original logical unit that has not been overwritten since the snapshot operation, according to an embodiment of the present invention.

FIG. 29 shows a READ operation directed to a block within the original logical unit that has not been overwritten since the snapshot operation, according to an embodiment of the present invention. As shown in FIG. 29, the READ operation is forwarded by the original array controller 1504 to the second array controller 1802 for execution with respect to the map 2306 associated with the snapshot logical unit. Optionally, at the same time, when the block read by the second array controller 1802 is returned to the original array controller 1504, along with a logical-block reference for the block, the original controller may allocate a new logical block 2902 for the block that was read, copy the original contents of the block 2904 to the new logical block 2902, and enter a reference 2906 into the map 2206 associated with the original logical unit to the newly allocated logical block 2902. In a second, alternative, optional step, the original array controller 1504 may enter a reference 2906 into the map 2206 for the original logical unit that references the original block 2904. In the second, alternative optional step, a partially distributed map results from entering the reference into the original array controller's mapping, which, as discussed above, may not be desirable. Also, this alternative step would not be desirable were a significant fraction of the not-overwritten logical blocks to be accessed via the original array controller, since the mapping was exported from the original array controller as part of the snapshot operation. In both cases, carrying out the optional step by the first array controller ensures that subsequent reads to the original-logical-unit block may be handled entirely by the original controller 1504, without the need to forward the READ operation to the new array controller 1802. Whether either of the two optional methods following execution of the READ operation by the new array controller 1802 is preferred depends on many different characteristics of the array cluster, discussed above with reference to allocate-on-write and copy-on-write strategies.

Control-Flow Diagrams Representing One Embodiment of the Present Invention

Figure 30:
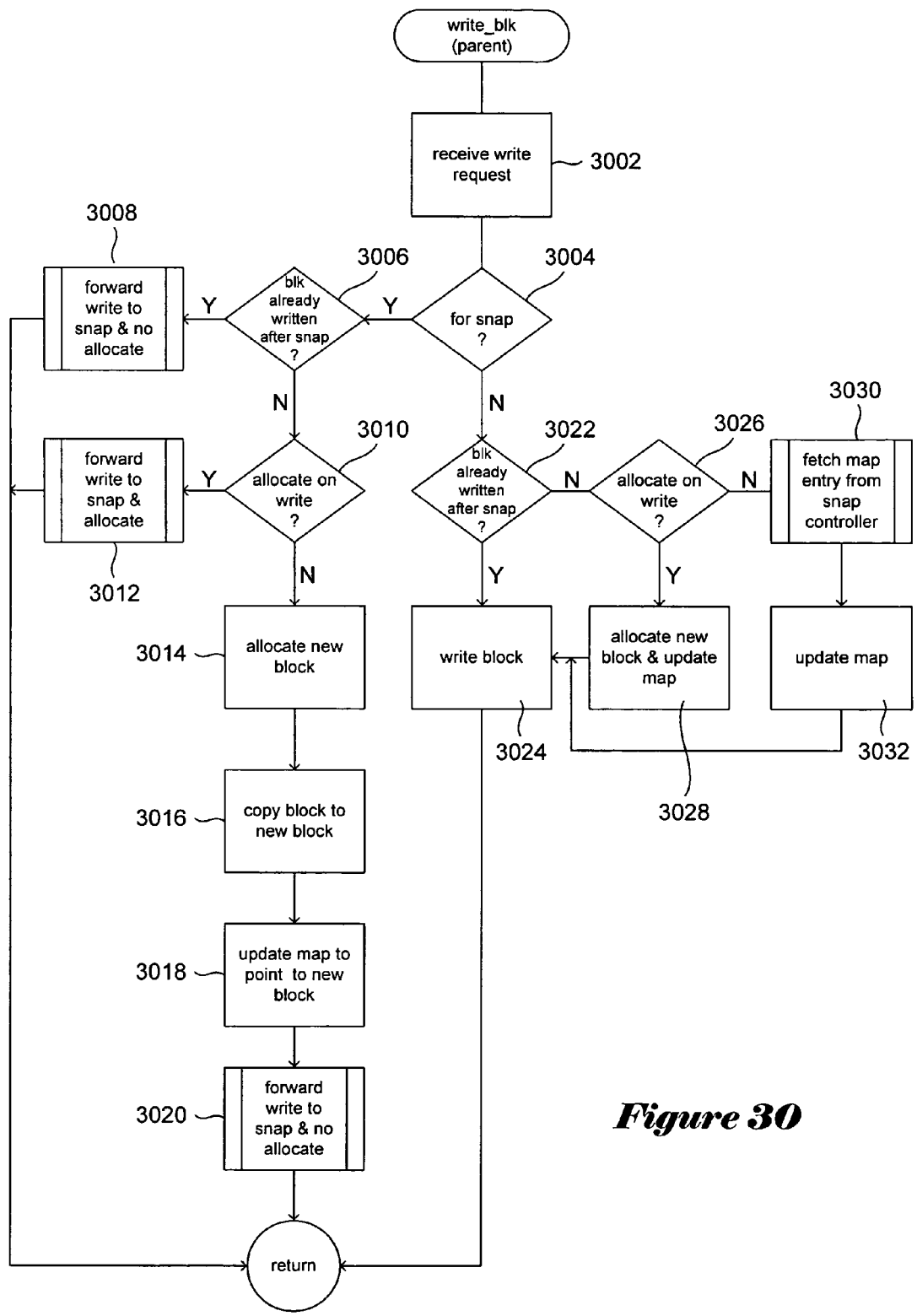
FIGS. 30-32 show control-flow diagrams that illustrate WRITE access operations, representing embodiments of the present invention, carried out with respect to an original logical unit and a snapshot logical unit produced by a prior snapshot operation.
Figure 31:
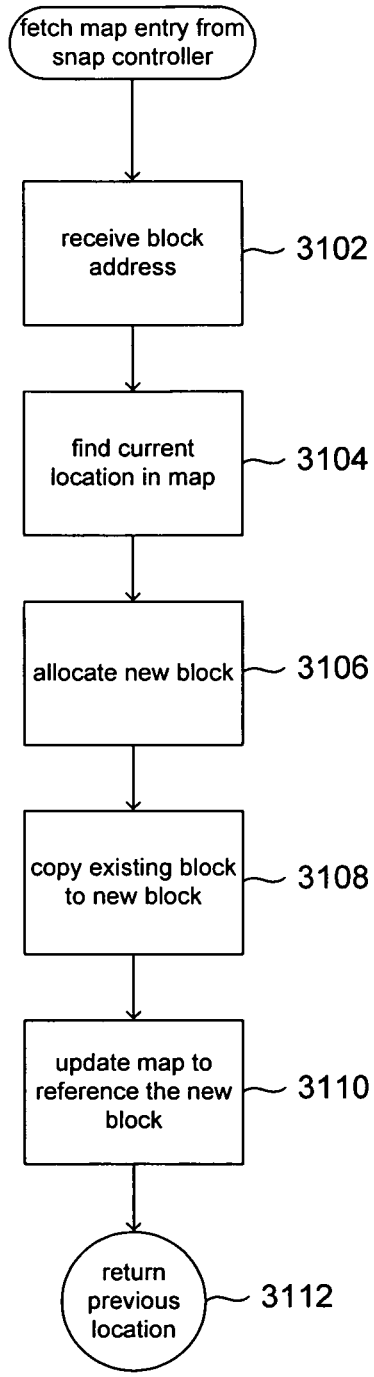
Figure 32:
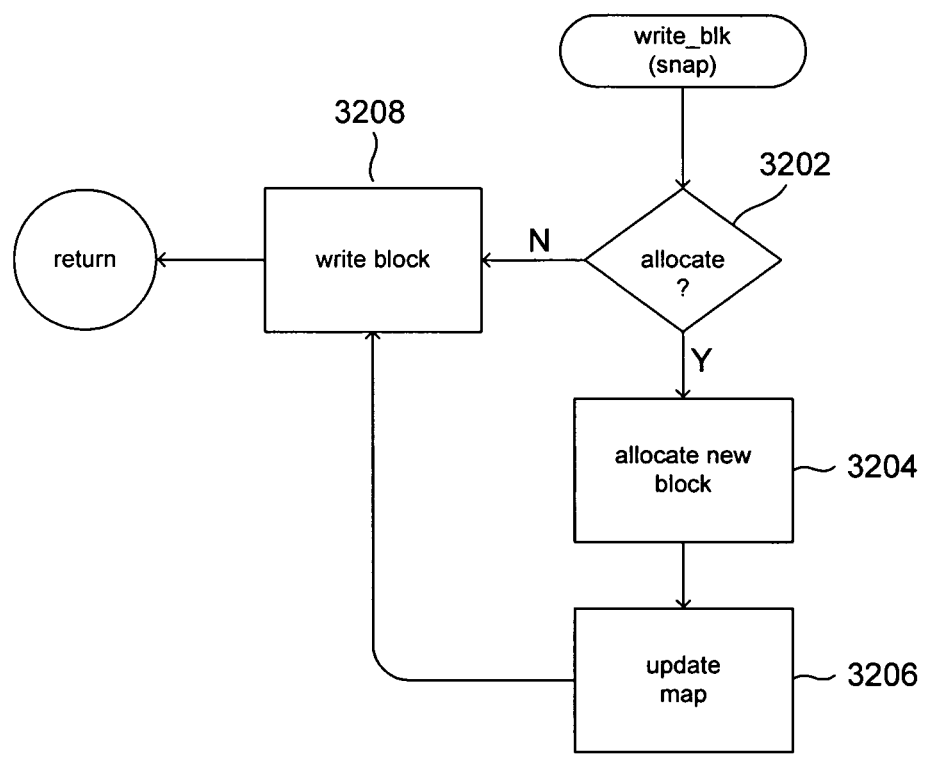

FIGS. 30-32 show control-flow diagrams that illustrate WRITE access operations, representing embodiments of the present invention, carried out with respect to an original logical unit and a snapshot logical unit produced by a prior snapshot operation. First, in step 3002, a WRITE request is received. In step 3004, the routine "write_block" determines whether or not the WRITE request is directed to the snapshot copy or to the original logical unit. If the WRITE request is directed to the snapshot copy, then, in step 3006, the routine "write_block" determines whether the block has already been overwritten following the snapshot operation. If so, then, in step 3008, the routine "write_block" forwards the WRITE operation to the controller associated with the snapshot logical unit for execution. If the block has not already been written, as determined in step 3006, then, in step 3010, the routine "write_block" determines whether an allocate-on-write method should be employed with respect to the block. If so, then the WRITE operation is forwarded to the controller associated with the snapshot logical unit 3012 with an indication that the controller associated with the snapshot logical unit should allocate a new logical block and alter the map associated with the snapshot logical unit to reference the new logical block. Otherwise, in step 3014, the routine "write_block" allocates a new block in logical-block-address space, copies the original block to the newly allocated block, in step 3016, updates the map associated with the original logical unit to point to the new block, in step 3018, and forwards the WRITE operation to the controller associated with the snapshot logical unit, in step 3020. Returning to step 3004, if the received WRITE request is directed to the original logical unit, as determined in step 3004, then, in step 3022, the routine "write_block" determines whether or not the block has already been written following the snapshot operation. If so, then the routine "write_block" writes the block to the logical block referenced in the map associated with the original logical unit, in step 3024. Otherwise, in step 3026, the routine "write_block" determines whether or not an allocate-on-write method should be used. If so, then, in step 3028, the routine "write_block" allocates a new block and updates the map associated with the original logical unit to reference the new block, and then writes the block in step 3024. Otherwise, in step 3030, the routine "write_block" calls a routine to fetch the map entry from the controller associated with the snapshot logical unit that references the original block associated with the block. When called in this step, as discussed below, the controller associated with the snapshot logical unit allocates a new logical block, copies the data from the existing block to the new logical block, and updates the map associated with this snapshot logical unit to reference the new logical block.

FIG. 31 shows a control-flow diagram for the routine carried out by the array controller associated with the snapshot logical block in response to step 3030 in FIG. 30, according to an embodiment of the present invention. In step 3102, the array controller receives the block address for the block to be written. In step 3104, the array controller associated with the snapshot logical block finds the current logical-block address for the block in the map associated with the snapshot logical unit. In step 3106, the array controller allocates a new block and, in step 3108, the array controller copies the existing block contents to the new block. In step 3110, the array controller updates the map associated with the snapshot logical unit to point to the new block. Finally, in step 3112, the array controller returns the logical-block address of the original block to the array controller associated with the original logical unit.

FIG. 32 is a "write_block" routine associated with the controller associated with the snapshot logical unit, called in steps 3008, 3012, and 3020 in FIG. 30, according to an embodiment of the present invention. If the array controller associated with the snapshot logical unit has received an allocate-on-write indication, as determined in step 3202, then the routine "write_block" allocates a new block, in step 3204 and updates the map associated with the snapshot logical unit in step 3206 to reference the new block. Then, the block is written, in step 3208. Otherwise, the block can simply be written in step 3208.

Figure 33:
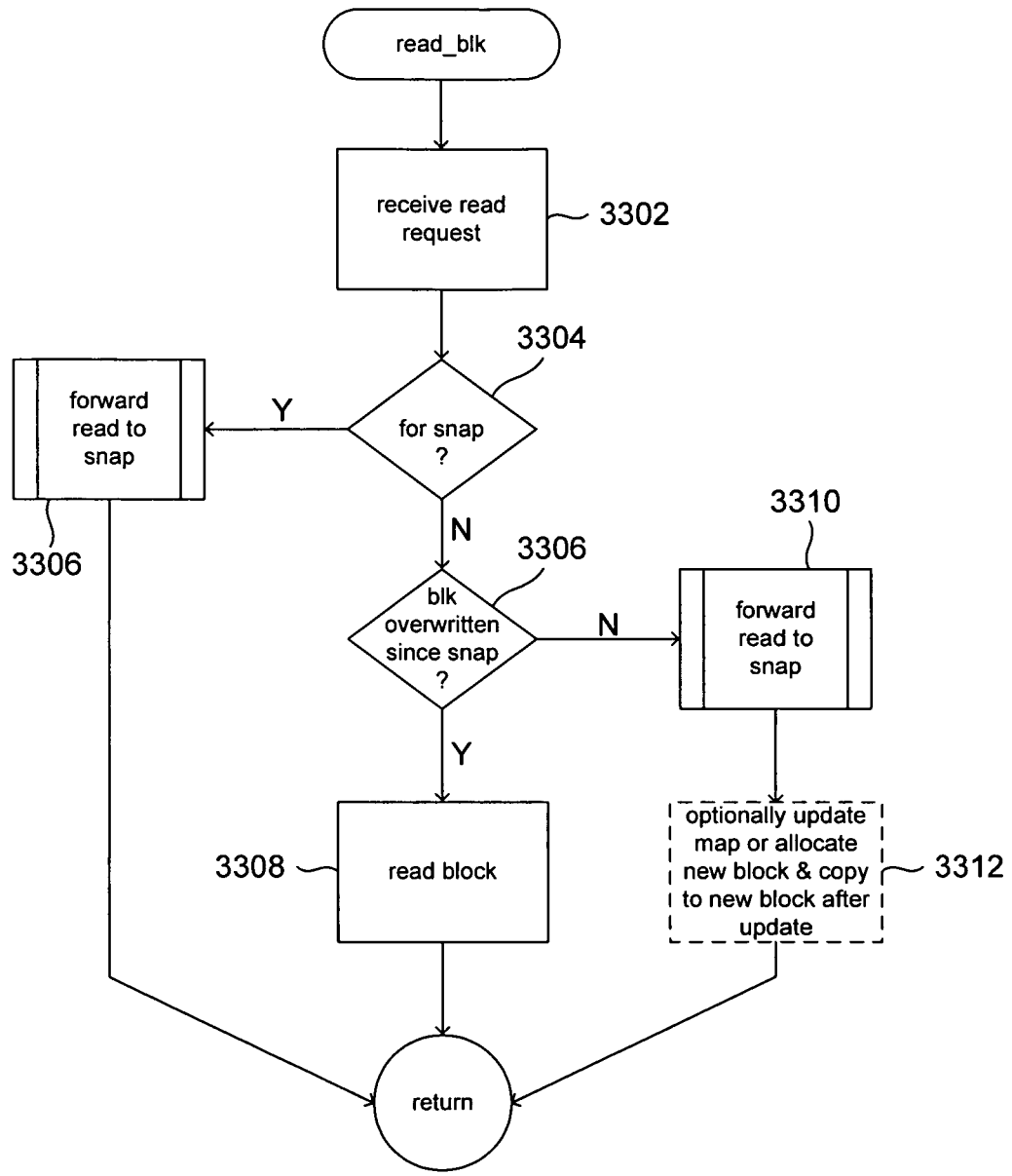
FIG. 33 shows a control-flow diagram that illustrates READ access operations carried out with respect to an original logical unit and a snapshot logical unit produced by a prior snapshot operation, according to an embodiment of the present invention.

FIG. 33 shows a control-flow diagram that illustrates READ access operations carried out with respect to an original logical unit and a snapshot logical unit produced by a prior snapshot operation, according to an embodiment of the present invention. In this routine, the array controller associated with the original logical unit receives a READ request, in step 3302. In step 3304, the routine "read_block" determines whether the READ is directed to the snapshot logical unit. If so, then the READ is forwarded to the snapshot logical unit, in step 3306. Otherwise, the routine "read_block" determines whether the block has already been overwritten since the snapshot operation, in step 3306. If so, then the block can be directly read, in step 3308. Otherwise, in step 3310, the READ operation is forwarded to the array controller associated with the snapshot logical unit for execution. Following return of the read data by the array controller associated with the snapshot logical unit, the routine "read_block" may optionally, in step 3312, update the map associated with the original logical unit to reference the block read in step 3310, or, alternatively, may allocate a new block, copy the existing block to the new block, and update the map associated with the original logical unit to reference the new block.

The above discussion is directed to single snapshot operations within array clusters. However, snapshot operations may be carried out successively with respect to an original logical unit, generating a chain of snapshot logical units at successive points in time. Furthermore, snapshot operations can be carried out against snapshot logical units, in which case a snapshot logical unit becomes the original logical unit for a snapshot operation. In such cases, snapshot logical units related to an original logical unit may end up distributed across multiple array controllers within an array cluster. In such cases, when deferred-copying snapshot methods are used, READ and WRITE commands may need to be forwarded through a series of array controllers, rather than the single-step forwarding discussed above with respect to a single snapshot operation. While, in the above discussion, a snapshot logical unit is associated with a single array controller, in alternative embodiments of the present invention, a snapshot logical unit may be distributed across multiple array controllers. As discussed above, allocate-on-write and copy-on-write methods represent two different approaches to handling multiple references within an original-logical-unit map and a snapshot-logical-unit map to a single logical block. As discussed above, whether or not these methods are applied, and access operations directed to the original logical unit and the snapshot logical unit, depends on the types and rates of access to the original logical unit and snapshot logical unit subsequent to the snapshot operation, as well as data locality requirements, the current mapping of logical units to the logical-block-address space, and other considerations. In certain array-cluster embodiments of the present invention, a background process running on either an original array controller or on the array controller associated with a snapshot logical unit may continuously, as allowed by the current processing and communications load on the array controller, copy blocks not yet overwritten, since a snapshot operation, in order to facilitate divergence of the original logical unit and the snapshot logical unit. Thus, rather than passively rely on divergence of the snapshot logical unit from the original logical unit, over time, as a result of WRITE accesses to the original logical unit and snapshot logical unit, the background process may actively copy blocks to newly allocated blocks, and accordingly update the original logical unit mapping or snapshot logical unit mapping. In certain array-cluster embodiments of the present invention, these conditions may be monitored in order to dynamically adjust snapshot-operation-related access methods in order to achieve optimal array-cluster operation under specified constraints. In the above discussion, only certain of the potentially many mappings between address spaces within an array cluster are discussed. Additional mappings may provide additional levels of indirection that can be exploited for adding further flexibility to data storage associated with snapshot logical units.

Although the present invention has been described in terms of particular embodiments, it is not intended that the invention be limited to these embodiments. Modifications within the spirit of the invention will be apparent to those skilled in the art. For example, distributed snapshot operations may be implemented in any number of different programming languages, using any number of different combinations of modular organizations, control structures, data structures, and other such programming parameters. As discussed above, snapshot operations' may be chained, and snapshot operations may be conducted with respect to snapshot logical units, potentially creating snapshot-related maps distributed among multiple array controllers. The above discussion used various high-level abstractions for the various mappings employed within array controllers to implement distributed snapshots. The actual implementations may involve a variety of different types of data structures, designed for efficient access and update by array controllers. Although snapshots are discussed with reference to logical units, snapshots may be carried out, in certain systems, on smaller granularities. Snapshots may or may not be redundantly stored. Whether or not a snapshot logical unit is distributed to a different array controller than the array controller currently associated with the original logical unit may be, in certain systems, specified or suggested by a host computer, and, in alternative embodiments, may be determined by the array controller receiving the snapshot command. In many embodiments, snapshot distribution may be carried out following a snapshot operation and subsequent determination of a need for load balancing.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An array cluster comprising:
    two or more mass-storage devices; and
    two or more array-cluster controllers that access the mass-storage devices through a first communications medium that interconnects the two or more mass-storage devices with the two or more array-cluster controllers, at least one of the two or more array-cluster controllers providing a distributed snapshot operation to host computers that access the at least one of the two or more array-cluster controllers through a second communications medium.

2. The array cluster of claim 1 wherein each array-cluster controller comprises:
    one or more processors; and
    firmware and software routines executed on the one or more processors for providing an external interface to host computers and for mapping a logical unit number and data-block address specified by a host computer to a logical-block address associated with one of the two or more mass-storage devices.

3. The array cluster of claim 1 wherein, when a first array-cluster controller from among the two or more array-cluster controllers receives a snapshot command from a host computer directed to a logical unit number, the first array-cluster controller:
    determines whether or not to associate the snapshot logical unit that results from execution of the snapshot operation with a second array-cluster controller; and
    when the snapshot logical unit is determined to be associated with a second array-cluster controller as a result of a distributed snapshot operation, directs the second array-cluster controller to prepare to map access commands directed to the snapshot logical unit to array-cluster logical-block-address space.

4. The array cluster of claim 3 wherein the first array-cluster controller transfers the mapping of data-block addresses for the original logical unit to the second array-cluster controller.

5. The array cluster of claim 3 wherein the first array-cluster controller transfers a copy of the mapping of data-block addresses for the original logical unit to the second array-cluster controller.

6. The cluster of claim 3 wherein, upon receiving a WRITE command directed to an original-logical-unit data block that has not been overwritten following the snapshot operation, the first array-cluster controller:
    allocates a new logical block;
    enters a reference to the logical block into an original-logical-unit mapping; and
    executes the WRITE command to the newly allocated logical block.

7. The cluster of claim 3 wherein, upon receiving a WRITE command directed to an original-logical-unit data block that has not been overwritten following the snapshot operation, the first array-cluster controller:
    forwards the WRITE command to the second array-cluster controller, the second array-cluster controller, in response to receiving the WRITE command, allocating a new logical block, entering a reference to the logical block in a snapshot-logical-unit mapping, and executing the WRITE command to the newly allocated logical block.

8. The cluster of claim 3 wherein, upon receiving a WRITE command directed to a snapshot-logical-unit data block that has not been overwritten following the snapshot operation, the first array-cluster controller:
    allocates a new logical block;
    enters a reference to the logical block into an original-logical-unit mapping;
    copies the contents of the existing data block to the newly allocated logical block; and
    forwards the WRITE command to the second array-cluster controller for execution.

9. The cluster of claim 3 wherein, upon receiving a WRITE command directed to a snapshot-logical-unit data block that has not been overwritten following the snapshot operation, the first array-cluster controller:
    forwards the WRITE command to the second array-cluster controller, the second array-cluster controller, in response to receiving the WRITE command, allocating a new logical block; entering a reference to the logical block in a snapshot-logical-unit mapping, and executing the WRITE command to the newly allocated logical block.

10. The cluster of claim 3 wherein, upon receiving a WRITE command directed to an original-logical-unit data block that has been overwritten following the snapshot operation, the first array-cluster controller:
  executes the WRITE command to a logical block indicated in an original-logical-unit mapping.

11. The cluster of claim 3 wherein, upon receiving a WRITE command directed to a snapshot-logical-unit data block that has been overwritten following the snapshot operation, the first array-cluster controller:
  forwards the WRITE command to the second array-cluster controller for execution to a logical block indicated in the snapshot-logical-unit mapping.

12. The cluster of claim 3 wherein, upon receiving a READ command directed to an original-logical-unit data block, whether or not overwritten following the snapshot operation, the first array-cluster controller:
  executes the READ command to a logical block indicated in an original-logical-unit mapping.

13. The cluster of claim 3 wherein, upon receiving a READ command directed to a snapshot-logical-unit data block that has not been overwritten following the snapshot operation, the first array-cluster controller:
  forwards the READ command to the second array-cluster controller for execution to a logical block indicated in the snapshot-logical-unit mapping.

14. The cluster of claim 13 wherein, upon receiving a READ command directed to a snapshot-logical-unit data block that has not been overwritten following the snapshot operation, the first array-cluster controller additionally adds a reference to the logical block corresponding to the data block in an original-logical-unit mapping.

15. The cluster of claim 13 wherein, upon receiving a READ command directed to a snapshot-logical-unit data block that has not been overwritten following the snapshot operation, the first array-cluster controller additionally allocates a new logical block, copies the data read by the second array-cluster controller into the newly allocated logical block, and updates the mapping maintained by the first array controller to reference the newly allocated logical block.

16. The cluster of claim 3 wherein, upon receiving a READ command directed to a snapshot-logical-unit data block that has been overwritten following the snapshot operation, the first array-cluster controller:
  forwards the READ command to the second array-cluster controller for execution to a logical block indicated in the snapshot-logical-unit mapping.

17. The array cluster of claim 3 wherein, when a first array-cluster controller determines whether or not to associate the snapshot logical unit that results from execution of the snapshot operation with a second array-cluster controller by one or more of:
  receiving a specification from a host computer;
  receiving a suggestion from a host computer; and
  analyzing current conditions and characteristics within the array cluster, including total load on the array cluster;
    loads on each array-cluster controller;
    data-locality constraints,
    high-availability-related and fault-tolerance-related constraints, and
    the current data-block mappings to logical-block address space.

18. The array cluster of claim 3 wherein a background process running on one of the first array controller and second array controller continuously copies blocks and updates mappings in order to actively cause the original logical unit and the snapshot logical unit to diverge from one another.

19. A method for carrying out a snapshot operation on a logical unit by a first array-cluster controller, the method comprising:
  in an array cluster including two or more mass-storage devices, the first array-cluster controller, and a second array-cluster controller, the first and second array-cluster controllers accessing the two or more mass-storage devices through a first communications medium that interconnects the two or more mass-storage devices with the first and second array-cluster controllers, receiving the snapshot operation from a host computer; and
  arranging for a snapshot logical unit to initially virtually map the logical unit, the snapshot logical unit maintained by the second array-cluster controller.

20. The method of claim 19 wherein host access operations directed both to the logical unit and to the snapshot logical unit are received by the first array-cluster controller, with access operations directed to the snapshot logical unit forwarded by the first array controller to the second array controller.

* * * * *